United States Patent [19]

Tung

[11] 4,324,775
[45] * Apr. 13, 1982

[54] PROCESS FOR RECOVERING SULFUR BY REMOVAL OF SULFUR DIOXIDE FROM GASEOUS MIXTURES

[76] Inventor: Shao E. Tung, 91 Blake Rd., Brookline, Mass. 02146

[*] Notice: The portion of the term of this patent subsequent to Oct. 5, 1993, has been disclaimed.

[21] Appl. No.: 129,079

[22] Filed: Mar. 10, 1980

Related U.S. Application Data

[63] Continuation-in-part of Ser. No. 838,913, Oct. 3, 1977, Pat. No. 4,211,761, which is a continuation-in-part of Ser. No. 728,174, Sep. 30, 1976, Pat. No. 4,101,643, which is a continuation-in-part of Ser. No. 499,582, Aug. 22, 1974, Pat. No. 3,084,529.

[51] Int. Cl.$^3$ .................. C01B 17/48; C01B 17/00; C01B 17/04
[52] U.S. Cl. .................. 423/539; 55/73; 210/638; 423/242; 423/243
[58] Field of Search ............ 423/181, 242, 243, 539; 55/73; 210/26, 37 R

[56] References Cited

U.S. PATENT DOCUMENTS

| | | | |
|---|---|---|---|
| 1,946,489 | 2/1934 | DeJaln | 423/539 |
| 2,128,027 | 8/1938 | Clark | 423/243 |
| 3,633,339 | 1/1972 | Wiewiorowski | 423/242 |
| 3,684,219 | 3/1972 | Lynn et al. | 423/181 |
| 3,779,907 | 12/1973 | Li et al. | 210/37 R |
| 3,833,710 | 9/1974 | Deschamps | 423/242 |
| 3,896,214 | 7/1975 | Newman | 423/242 |
| 3,911,093 | 10/1975 | Sherif et al. | 423/242 |
| 3,984,529 | 10/1976 | Tung | 423/242 |
| 4,029,744 | 6/1977 | Li et al. | 423/539 |
| 4,080,423 | 3/1978 | Smith et al. | 423/242 |
| 4,101,643 | 7/1978 | Tung | 423/575 |
| 4,211,761 | 7/1980 | Tung | 423/539 |

FOREIGN PATENT DOCUMENTS 400998 11/1933 United Kingdom ............... 423/243

Primary Examiner—Gary P. Straub
Attorney, Agent, or Firm—Laney, Dougherty, Hessin & Beavers

[57] ABSTRACT

A process for removing sulfur dioxide from a mixture of gases and recovery of sulfur dioxide. The sulfur dioxide is first contacted in a scrubbing zone with an aqueous solution of a salt, $M_2B$, where M is a alkali metal cation, and B is a divalent anion derived a weak acid which has an ionization constant (pKa) value of at least 3.0. The pregnant scrubbing solution is then contacted with an amine acid salt, AHB, where A is an amine cationic group containing a hydrophobic subgroup of 8–45 carbons, and HB is a monovalent proton containing anion of a weak acid, to form by ion exchange, an amine hydrogen sulfite and an aqueous solution of alkali metal salt containing the anion HB. The sulfur bearing amine is heated to decompose the sulfite, releasing sulfur dioxide and a reduce sulfur content amine phase. The reduced sulfur content amine phase is contacted with the aqueous solution of alkali metal HB salt to regenerate the scrubbing salt solution of $M_2B$ and the amine acid salt AHB. The heating of the sulfur bearing amine can be conducted separate from the aqueous alkali metal salt solution, or in the presence thereof. When the sulfur bearing amine is heated in the presence of the alkali metal salt solution, sulfur dioxide release and regeneration occur in situ and simultaneously. The regenerated salt solution is recycled to the scrubber and the amine acid salt is recycled to the anion exchange step. Citrate and phosphate salts are preferred for the scrubbing salt and the amine acid salt.

17 Claims, 3 Drawing Figures

PROCESS FOR RECOVERING SULFUR BY REMOVAL OF SULFUR DIOXIDE FROM GASEOUS MIXTURES

RELATED APPLICATIONS

This application is a continuation-in-part of U.S. patent application Ser. No. 838,913 filed Oct. 3, 1977, now U.S. Pat. No. 4,211,761 which application Ser. No. 838,913 is a continuation-in-part of my U.S. patent application Ser. No. 728,174 filed Sept. 30, 1976, now U.S. Pat. No. 4,101,643 issued July 18, 1978, which application is in turn a continuation-in-part of my U.S. patent application Ser. No. 499,582 entitled "Process for Recovering Sulfur by Removal of Sulfur Dioxide from Gaseous Mixtures," filed Aug. 22, 1974, now U.S. Pat. No. 3,984,529 issued on Oct. 5, 1976.

BACKGROUND OF THE INVENTION

1. Field of the Invention

This invention relates to a process for removing relatively small quantities of sulfur dioxide gas from gaseous mixtures.

2. Brief Description of the Prior Art

In my U.S. Pat. No. 3,984,529, I review various prior efforts to provide economical and efficeint processes for removing sulfur dioxide gas fromgaseous mixtures, such as stack gases or the like. Removal of sulfur dioxide is desirable in order to obviate or reduce atmospheric pollution, and also in order to avoid the loss of the economic value represented by the recovered sulfur or sulfur compounds constituting potential end products of the recovery process.

In my referenced patent, I describe procedures and certain proposed methods which generally include the step of initially contacting the gaseous mixture which contains the sulfur dioxide with an aqueous solution containing a removal reactant so as to form a condensed phase in which the removed sulfur dioxide is combined chemically with the removal reactant in the form of sulfite or hydrosulfite compounds in aqueous solution. The removal reactants contemplated for use in the processes described include, inter alia, alkali metal hydroxides, and salts of weak acids and alkali metal hydroxides.

After formation of the pregnant scrubbing solution which contains compounds including combined sulfite ions derived from the extracted $SO_2$ gas, the pregnant scrubbing solution is contacted with an organic liquid phase which includes, as an active component, certain nitrogen-containing water-immiscible organic compounds which have specified properties. Among such compounds which are effective and are preferred at this point in the process are various types of long chain alkyl amines which contain from about 12 to about 45 carbon atoms, and have a solubility in water of less than 0.2 gm/100 gms of water at 25° C., and the water immiscible salts of these basic compounds. When the amine salts are used as the transfer reactants, their water solubility should not exceed about 5 gms/100 gms of water at 25° C. Such amine salts are generally derivable from free amines having the degree of immiscibility prescribed above. The result of contacting the pregnant scrubbing solution with the described amine-containing organic liquid phase is to transfer the sulfite ions from the pregnant aqueous scrubbing solution to the organic phase as a result of chemical combination of sulfite ions with the long chain alkyl amines. A concomitant result of the described contact is the regeneration of the scrubbing solution containing the selected removal reactant so that it can be recycled to the scrubbing zone, and used for contacting the gaseous mixture from which additional $SO_2$ is to be subsequently removed.

The organic phase developed upon contact of the long chain amine with the pregnant scrubbing solution contains long chain amine sulfites, and is contacted with hydrogen sulfide so as to reduce the sulfur-containing salts therein to elemental sulfur, and concurrently regenerate the long chain amine. The amine can then be reutilized for contacting additional sulfite-containing pregnant scrubbing solution from the scrubbing zone for the purpose of repeating the transfer of sulfite ions into the organic phase.

When an amine salt is used instead of an amine as the transfer agent, the transfer step will yield an acid in the aqueous phase. This acid can be removed by contacting this aqueous phase with the organic phase from the reduction step where the regenerated amine will combine with the acid to form the amine salt. After this "recontact," the aqueous solution can be recycled to the scrubber and the organic phase can be utilized as recycled transfer agent.

My U.S. Pat. No. 4,101,643 described an improvement on the foregoing described basic process which comprises initially contacting the gas from which the sulfur dioxide is to be removed with an aqueous solution of an alkali metal sulfite. In the course of this scrubbing step, the $SO_2$ in the gaseous mixture combines with the alkali metal sulfite to yield the hydrosulfite salt in aqueous solution. The pregnant aqueous solution resulting from scrubbing is next contacted with a liquid organic phase which contains one or more substantially water-immiscible long chain amine compounds capable of extracting sulfite ions from the pregnant scrubbing solution by chemical combination therewith. Upon the termination of intimate contact between the organic extractant phase and the aqueous phase, the alkali metal sulfite is regenerated in the aqueous phase so that the scrubbing solution thus formed can be recycled to the scrubbing zone of the process. The organic phase, which contains long chain amine sulfites upon completion of the transfer reaction, is then heated to a temperature sufficiently high that the amine sulfites therein undergo thermal decomposition to yield sulfur dioxide. The decomposition of the amine sulfites concurrently produces free amines which can be reused in carrying out further extraction of sulfite ions from additional scrubbing solution.

The sulfur dioxide generated by decomposition of the amine sulfite in the organic phase can be used as an end product, or it can be converted to element sulfur by various conventional methods known to the art.

In my U.S. application Ser. No. 838,912, now abandoned, it was proposed to use a catalytic amount of water inthe decomposition step. The presence of water in such amount facilitates the decomposition of amine sulfite and/or amine hydrosulfite to free amine and gaseous $SO_2$.

In my cop-pending U.S. application Ser. No. 838,913, the $SO_2$ is first contacted in a scrubbing zone with a scrubbing agent which is an aqueous solution of an alkali metal salt of a weak acid which has an ionization constant (pKa) value of at least 3.5. The pregnant scrubbing solution is then contacted with an organic transfer reactant which is a water-immiscible, water insoluble amine salt to effect a transfer reaction by which the sulfite ions are transferred to the non-aqueous phase by way of an ion exchange reaction. The sulfur bearing, non-aqueous phase is next heated to decompose the sulfite, yielding $SO_2$ and a water-immisicible, water insoluble amine-bearing compound. The amine-bearing compound is next contacted with the aqueous solution from the transfer step. After this contact, the regenerated aqueous scrubbing solution is recycled to the scrubber, and the regenerated organic solution is recycled to ion exchange with additional pregnant scrubbing solution.

In Wiewiorowski U.S. Pat. No. 3,633,339, a process is prescribed for removing sulfur dioxide from gases, and initially entails contacting the gas containing the sulfur dioxide with an aqueous solution of ammonium phosphate. The pH of the thus constituted scrubbing solution is indicated by the patentee to be from about 3.0 to about 5.0 with the best range being between 3.5 and 4.5. The pregnant scrubbing solution contains ammonium hydrosulfite and ammonium phosphate. This pregnant scrubbing solution is then contacted with an organic extractant to extract sulfite ions into the organic phase. Subsequently, the organic phase is heated and subjected to stripping to yield concentrated sulfur dioxide gas therefrom.

Several problems characterize the Wiewiorowski process which make it less efficient than my process disclosed in U.S. Pat. No. 4,101,643. These were discussed in the referenced patent. Additionally, another disadvantage of the Wiewiorowski process is that some ammonia will be retained in the organic extract and released together with $SO_2$ during the subsequent steam stripping. Separation of $SO_2$ and $NH_3$ in the regenerated gas stream is difficult.

Further, though it is not a major object to the ammonium phosphate scrubbing process, the use of ammonium salt of this type tends to cause the formation of an undesirable "plume" at the top of the flue gas stack—an obviously undesirable aspect in terms of real, as well as apparent, atmospheric pollution. The plume results from finely divided ammonium salts apparently formed in the gas phase reactions.

In another previously known $SO_2$ removal process, the aqueous solution of sodium sulfite is used for scrubbing purposes. The pregnant scrubbing liquor, which is essentially an aqueous solution of sodium hydrosulfite, is then directly (without intervening processes) decomposed thermally to yield sulfur dioxide. In this method of proceeding, however, the heat input required to effect thermal decomposition of the hydrogen sulfite, as well as to vaporize a large quantity of water, is great. The water vapor thus emitted with sulfur dioxide must be subsequently condensed. The development of the large quantity of water vapor also complicates control of the decomposition process.

Another serious drawback of the described process involving direct decomposition of the sodium hydrosulfite is that at the temperature level at which decomposition of the aqueous hydrosulfite occurs, a portion of the hydrosulfite converts to sulfate. This conversion commonly yields from 5% to 10% sodium sulfate by-product, which represents a corresponding loss in the total sodium value required in the system for scrubbing purposes. In addition, removal of the sodium sulfate by-product is a complicated procedure involving several process steps.

BRIEF DESCRIPTION OF THE PRESENT INVENTION

The present invention constitutes an improvement over the processes for removal of sulfur dioxide from a gaseous mixture as such processes are described in my U.S. Pat. No. 4,101,643 and in my co-pending Application Ser. No. 838,913. Basically, the improvement resides in part in the improvements that are realized in the completeness of the transfer reaction and the subsequent decomposition of the amine sulfite compounds leading to the recovery of $SO_2$ upon such decomposition, whereby the overall efficiency of the process is improved. This improvement in efficiency resulted from a number of innovations and discoveries which will be described hereinafter. Furthermore, certain further improvements are realized in the suppression or elimination of certain undesirable side reactions. Such reactions have now been observed to tend to occur in the case of the portion of the process occurring subsequent to the transfer reaction in which sulfite ions are transferred into the organic phase by combination with the amine compounds.

Broadly described, the process of the present invention comprises initially contacting the gaseous mixture from which the sulfur dioxide is to be removed with an aqueous solution of a strong base - weak acid salt. The salt preferably has certain characteristics which relate to the pKa value of the weak acid from which the salt is obtained. In the course of this scrubbing step, the $SO_2$ in the gaseous mixture reacts with the scrubbing salt to yield a hydrosulfite salt in an aqueous solution.

The pregnant aqueous scrubbing solution is next contacted with a liquid organic phase which contains one or more substantially water-immiscible amine compounds capable of ion exchange with the sulfite compounds in the pregnant scrubbing solution to form amine sulfite compounds. In this connection, I have now unexpectedly discovered that when amine salt is used in lieu of amine as a transfer agent, as described in my U.S. Pat. No. 4,101,643, the subsequent release of $SO_2$ from the sulfur-containing transfer compound is much facilitated. Contact between the organic extractant phase and the aqueous phase results in the aqueous scrubbing solution being partially regenerated. The organic phase, which contains amine sulfites upon completion of the ion exchange reaction (hereinafter termed th transfer reaction) is then heated, preferably in the presence of a catalytic amount of water, to a temperature sufficiently high that the amine sulfites therein undergo hydraulic/thermal decomposition to yield sulfur dioxide. The decomposition of the amine sulfites concurrently produces free amines. These are next brought into contact (hereinafter termed "recontact") with the partially regenerated scrubbing solution. In this recontacting step , the free amines are converted to amine salts, and the regeneration of scrubbing solution is completed. Upon completion of this recontact step, the regenerated aqueous scrubbing solution can be recycled to the scrubbing zone of the process, and the organic layer containing amine salt is cycled to the transfer reaction area, and is beneficially employed in carrying out further ion exchange of sulfite ions from additional pregnant scrubbing solution.

The sulfur dioxide generated by decomposition of the amine sulfite in the organic phase can be used as an end product, or it can be converted to elemental sulfur by various conventional methods known to the art.

In a preferred method of carrying out the process of the present invention, all of the process steps which occur after the scrubbing step can be combined into a single step prior to recycling the regenerated amine salts to the zone in which the ion exchange - transfer reaction is carried out and recycling the regenerated scrubbing solution to the scrubbing zone. Thus, the three steps individually identifiable as the transfer step, the decomposition step (for the purpose of freeing and releasing the $SO_2$ gas removed from the original scrubbed gaseous mixture), and the recontact step (for purposes of regenerating the transfer and scrubbing reactants) can be combined as one operating step. In this connection, I have unexpectedly discovered that when the three operating steps are combined, the transfer reaction and the subsequent decomposition reaction are greatly facilitated, resulting in a greater per cycle generation of $SO_2$ gas, as well as less residual sulfite retention, both in the regenerated scrubbing solution and in the regenerated transfer solution.

It is also preferred to carry out the thermal decomposition, whether separately or composited with the transfer reaction step and recontacting step, in the presence of a catalytic amount of water.

The process of the present invention offers a number of distinct and important advantages over the process disclosed in my U.S. Pat. No. 4,101,643, and in yielding these advantages, does so through the achievement of a number of objectives, some of which are as follows.

An important object of the present invention is to provide an improved $SO_2$ removal process through the utilization of an amine salt as a transfer agent for entering into an ion exchange reaction by which sulfite ions are transferred from a pregnant aqueous scrubbing solution to a chemically combined form in an amine compound in an organic phase. The use of the amine salt in this way, as contrasted with the use of a free amine, leads to the formation of a relatively larger amount of amine hydrosulfite, through the process of ion exchange with the pregnant scrubbing solution, and a relatively lesser amount of amine normal sulfite. Since the amine hydrosulfite decomposes more readily to yield $SO_2$ than does the normal sulfite, the ultimate decomposition of the organic sulfite compound to yield $SO_2$ is facilitated.

Another object of the invention is to achieve simplification of the process of recovering $SO_2$ from a gaseous mixture as described in my prior patent by combining the transfer, decomposition and recontact steps into a simple, concurrently performed procedure. Through the use of this single step operation, amine compounds having a relatively lower G value (lower basicity) than the previously thought to be needed can be effectively utilized as transfer reactants. This is because such amines, after forming amine sulfite through a transfer reaction, are subsequently decomposed to release $SO_2$, and the regenerated amine can be used over and over again until a substantial amount of $SO_2$ is released. Since amines of lower basicity generally form hydrosulfites which decompose more readily, the overall process efficiency is improved.

A further object of the invention is to enhance the efficiency and rate of decomposition of the organo-sulfite compounds formed by the transfer-ion exchange reaction through the inclusion in the reaction mixture, at a time when the transfer reaction and decomposition reaction are concurrently carried out, of an amount of an acidic salt, such as sodium dihydrophosphate, which acidic environment has been found to promote the decomposition of the amine hydrosulfite/sulfite compounds formed upon the transfer reaction, and thus to improve the efficiency of recovery of $SO_2$.

A further object of the invention is to increase the quantity of product $SO_2$ gas yielded in the process of the present invention, and more specifically, upon carrying out the decomposition step of the process, by carrying this step out concurrently with the transfer step of the reaction whereby residual sulfite compounds remaining in the aqueous layer, and not chemically altered in the ion exchange transfer reaction, will nevertheless be decomposed to yield $SO_2$ gas. In other words, single step regeneration has been unexpectedly demonstrated to yield more $SO_2$ gas per pass than if the three steps (i.e., transfer, decomposition and recontact) are to be conducted separately.

A further object of this invention is to reduce the number of undesirable side reactions occurring at the time of or after the transfer reaction which transpires during the process of the invention by providing an inert environment for carrying out the transfer reaction and decomposition reaction, thereby isolating these reactions from air contact and avoiding possible oxidation.

Another object of the present invention is to deter oxidation and other side reactions which deleteriously affect the unimpeded decomposition of amine hydrosulfite/sulfite salts formed during the transfer reaction forming a part of the process of the present invention. Such deterrence is obtained by utilizing an amine salt which preserves the proton during the transfer reaction, rather than a free amine as the transfer agent or reactant. Reduction of such oxidation and other side reactions is also realized by the inclusion of an acidic salt, such as sodium dihydrophosphate in the decomposition reaction mixture which is present when the transfer, decomposition and recontact steps are carried out concurrently in a single zone.

Another object of the invention is to improve the process described in my prior patents and applications by allowing water from the pregnant aqueous scrubbing solution to remain present during the heating of the amine sulfites formed in the transfer reaction for the purpose of decomposing these salts to yield $SO_2$, thereby deriving a catalytic effect of the water enhancing such decomposition, and concurrently benefiting by the tendency of the water to suppress oxidation and other undesirable side reactions which form water as a reaction product.

A further object of the invention is to improve the process for removing $SO_2$ from a gaseous mixture as heretofore known in those procedures utilizing a transfer reaction step, by making it possible to use a lesser amount of amine compound (smaller inventory) in carrying out such process, and specified by the transfer reaction step.

Another object of the invention is to provide, in combination with the basic process of the invention, a simple and effective sulfate removal procedure which functions to continuously remove any undesirable sulfate salt from the process streams, thus avoiding undesirable sulfate build-up during the process.

Another object of the invention is to provide a process for removal of $SO_2$ from a gaseous mixture, using as a scrubbing agent an alkali metal salt solution which is less susceptible to oxidation and to chemical attack by products of such side reactions as the disproportionation reaction of sulfite ion than is the alkali metal sulfite solution used in my U.S. Pat. No. 4,101,643.

Another object of the invention is to provide a process for removing sulfur dioxide from a mixture of gases, and entailing the steps of scrubbing the gaseous mixture, followed by extracting sulfite ions from the pregnant scrubbing solution, and ultimately, releasing sulfur dioxide gas from an organic phase from the extraction or transfer zone by heating the organic phase. The heat input required to attain the decomposition of sulfite compounds formed during the transfer reaction is relatively low as compared with some other types of prior art processes in which the end formed product is sulfur dioxide produced by thermal decomposition.

Among the additional objects and advantages which are achieved by the process of the present invention are:

The size of the apparatus and equipment which is required to carry out the process is small in comparison to the equipment previously used in many cases for removing noxious gases from industrial effluent gases.

The process of the invention requires a relatively low capital investment cost.

The operating cost of the process of the invention is low.

The process of the invention is highly reliable for continuous and uninterrupted operation.

The process can be employed to produce easily handled solid elemental sulfur as an end product.

The process can operate at relatively low temperature and at atmospheric pressure.

The process presents no severe corrosion problems.

Practically all of the process streams of the invention are pumpable.

Additional objects and advantages of the invention will become apparent as the following detailed description of the preferred embodiments of the invention is read in conjunction with the accompanying drawings and flow diagrams which illustrate the process of the invention.

GENERAL DESCRIPTION OF THE DRAWINGS

DETAILED DESCRIPTION OF A PREFERRED EMBODIMENT OF THE INVENTION

Figure 1:
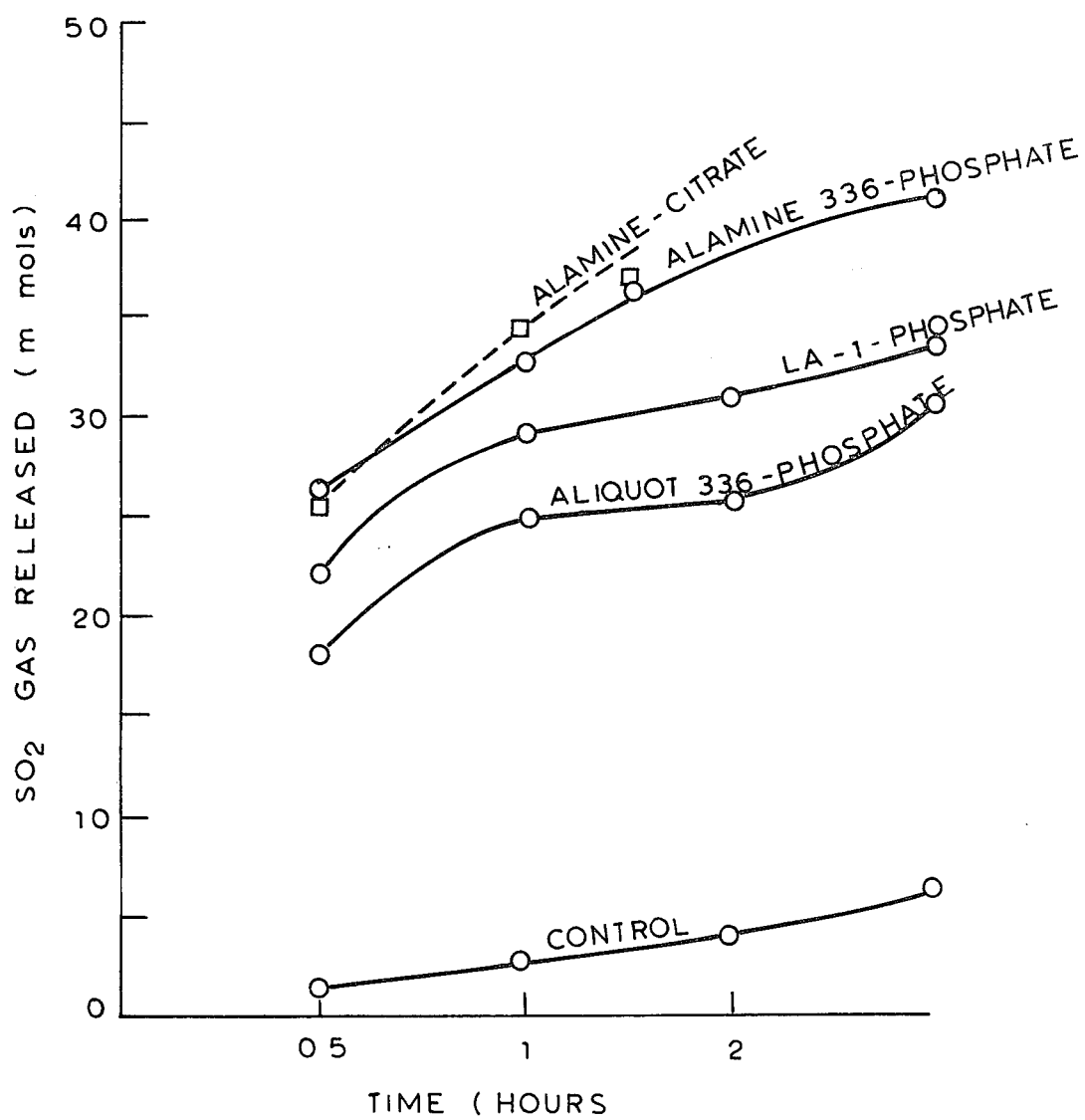
FIG. 1 is a graphic portrayal of the results of tests of several amine salts to evaluate how each of them improves the overall efficiency of the combined transfer-decomposition-recontact step of the invention. These experimental data represent a new discovery showing that the presence of amine salt facilitates the SO$_2$ release from a pregnant alkali metal salt based scrubbing liquor.

A. The Scrubbing Step and the Scrubbing Agent Used Therein

At the outset of the process of the invention, the mixture of gases which includes sulfur dioxide to be removed by the process of the invention is initially contacted with a scrubbing agent or compound. The means by which contact is established can be any of those well understood in the art, and for the purpose of disclosing a suitable contacting procedure, reference is made to my prior U.S. Pat. Nos. 3,984,529 and 4,101,643, the teachings of which are incorporated herein by reference, so far as not inconsistent with the disclosures of this application. In the process of the present invention, the scrubbing agents or compounds employed are salts of a strong base and certain weak acids. These salts are utilized in the form of an aqueous solution, and such solution may contain one or more of the strong base—weak acid salts. The buffering capability and ionization characteristic of the salt selected for use as the scrubbing agent in the invention is an important consideration. In demonstrating the importance of this characteristic of the salt used, it will be helpful to initially consider certain equilibrium relationships which apply in the case of the scrubbing reaction here involved.

The partial pressure of sulfur dioxide in the gas phase over an aqueous sulfite solution is prescribed by the following equilibrium relationships:

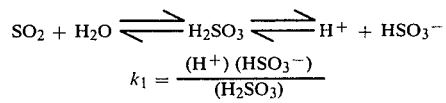

$$k_1 = \frac{(H^+)(HSO_3^-)}{(H_2SO_3)}$$

or

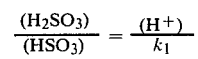

in which the terms in parentheses are concentration terms, and $k_1$ designates the first ionization constant of sulfurous acid (H$_2$SO$_3$). Further ionization of hydrosulfite is here neglected. These relationships signify that the partial pressure of sulfur dioxide in the gas phase is substantially proportional to the concentration of non-ionized sulfurous acid in the liquid phase. The dissolved sulfur dioxide, however, can also exist as hydrosulfite ions, and the proportionation between the non-ionized and ionized species of sulfite depends on hydrogen-ion concentration, pH, as well as the ionization constant, k. Consequently, if the scrubbing compound dissolved in the scrubbing solution is of such character that the hydrogen-ion concentration is buffered at 1/20 the value of $k_1$, 1/20 of the total dissolved sulfur dioxide will exist in the solution as non-ionized sulfurous acid and the solubility of sulfur dioxide in the aqueous solution of removal compound will then be approximately 20 times its solubility in water.

The ionization constant $k_1$ is $1.54 \times 10^{-2}$ at 25° C. If 20 times better SO$_2$ solubility than in water is adopted as the desirable minimum dissolving capacity that a scrubbing solution should have to warrant any practical consideration, then this scrubbing liquor should be buffered at a hydrogen ion concentration of $(1/20) \times 1.54 \times 10^{-2}$, or $7.7 \times 10^{-4}$, or a pH of 3.1 (or approximately 3.0). The pH of the scrubbing liquor (containing the removal compound) should thus be at least 3.0.

In the case of the present invention, the scrubbing solution consists of a strong base—weak acid salt in aqueous solution. The solution is buffered to provide the strongest buffering action, which status occurs when the hydrogen ion concentration is about equal to the ionization constant of the weak acid from which the salt is derived. Therefore, considering the pH limitation hereinbefore described, to warrant practical consideration as a strong base—weak acid salt useful as a removal reactant in the present invention, the pKa (ionization constant) of the parent acid of the salt must be larger than 3.0.

In examining the SO₂ absorption conditions more closely, the following equilibrium relationships are derived for a salt buffered system:

$$S = \frac{(H^+)^2 + k_1(H^+) + k_1k_2}{k_1(H^+) + 2k_1k_2}\left[(H^+) + \left\{\frac{k_b(H^+)}{k_w + k_b(H^+)} - \frac{k_a}{k_a + (H^+)}\right\}C - (OH^-)\right] \quad (1)$$

$$P_{SO_2} = \frac{h(H^+)^2}{(H^+)^2 + k_1(H^+) + k_1k_2}S \quad (2)$$

where S is the total molar concentration of dissolved SO₂ in moles per 1000 grams of water; C is the total molar concentration of the anions present in the original salt (scrubbing reactant), $P_{SO_2}$ is the partial pressure of the sulfur dioxide in the gas phase, $k_a$ and $k_b$ are the acid and base ionization constants of the parent acid and base that form the salt removal reactant; $k_1$, $k_2$ are the ionization constants of sulfurous acid, h is a Henry law constant for sulfur dioxide in water and $k_w$ is the water ionization constant, or $10^{-14}$.

Equations (1) and (2) can be used to compute the minimum pKa value a weak parent acid of an alkali metal (the preferred cation) salt (scrubbing reactant) must have, in order to achieve a desired level of equilibrium sulfur loading (solution of SO₂) under a certain set of operating conditions. Thus, for example, if the concentration of a scrubbing reactant in the scrubbing liquor is 8 moles/100 moles water (which is a convenient concentration of the scrubbing liquor to use in actual application, though for some salts, even higher concentration is permissible by their solubilities), and the sulfur dioxide concentration in the gaseous mixture from which it is to be removed is 2000 ppm, and the scrubbing liquor temperature is 150° F., then the pKa of the parent weak acid from which the salt used as scrubbing reactant is derived must exceed 7.2 (or about 7) in order to achieve a 90 percent sulfur loading (i.e., S/C=0.9). This minimum pKa value decreases to 5.1 (or about 5) to achieve a 70 percent equilibrium sulfur loading if the corresponding operating conditions are: 4 moles/100 moles water, 5000 ppm and 100° F., respectively. From this computation, it can be seen that if a salt of a strong base (alkali metal) and a weak acid is used as the scrubbing reactant, the pKa of the parent weak acid should be at least larger than 3.0, and from the point of view of scrubbing efficiency, is preferably larger than 5. Further, the computation demonstrates that for best scrubbing results, the pKa of the parent weak acid should be larger than 7.

A suitable scrubbing agent should not yield substantial amounts of any volatile compound in the decomposition step. Thus an ammonium salt is less suitable than alkali salt because ammonia gas may be evolved during decomposition. Sometimes salts of two alkali metals may be used to gain some overall salt solubility in water.

B. The Transfer Reaction Step and the Transfer Agent Utilized in Such Reaction

The ion exchange mechanism by which the transfer reaction constituting the second step of the process of the present invention is carried out is dealt with in some detail in my U.S. Pat. No. 4,101,643. As has been previously indicated, the transfer reaction is basically an ion exchange reaction in which the sulfite ions, in effect representing the SO₂ removed from the gaseous mixture in the scrubbing step, are transferred from the aqueous solution constituted by the spent scrubbing liquor into an amine compound-containing organic phase. This facilitates the subsequent controlled release and recapture of the removed SO₂ gas upon decomposition of the organic sulfite compounds formed by the ion exchange mechanism occurring during the transfer reaction.

The transfer reactants used are, in each case, amine salts (as contrasted with free amines) having certain broad or generic characteristics, and within such characteristics, including certain preferred species which have more definitive preferred characteristics. Broadly, the amine salt constituting the transfer reactant will contain at least one functional group selected from the functional groups —NH₂, >NH, >N— and

Additionally, the amine salt will contain a hydrophobic group constituted by a multi-carbon atom group which contains from about 8 to about 45 carbon atoms. The amine salt is substantially immiscible in water and does not form a stable emulsion with water. The amine salt does not contain any component which will undergo substantial volatilization upon being subjected to the temperatures needed for subsequent decomposition of the amine sulfite compounds formed during the transfer reaction. Finally, the amine salt does not contain any component which is significantly reactive with SO₂.

In order to understand certain preferred properties of the particular amine salts constituting the transfer reactants most useful in the practice of this invention, it will be helpful to consider the overall process reaction mechanisms which occur as the SO₂ removal process of the invention is carried out utilizing scrubbing agents and transfer reactants which contain several different types of anions. It will be recalled that the process may be viewed as including four reactive steps, with these including the scrubbing, transfer, decomposition and recontact steps, and that in a preferred practice of the invention, the transfer, decomposition and recontact steps are carried out concurrently and by treatment of the reaction mixture in the same reaction zone.

Considering initially the case in which the scrubbing agent is derived from a strong base (NaOH is used as the parent base by way of illustration) and includes a monovalent anion, $A^-$, derived from a weak acid, the several steps of the process can be characterized by the following equations if the amine salt be assumed to include the same anion, $A^-$:

| Scrubbing: | $NaA + H_2O + SO_2(\text{stack gas}) \rightarrow NaHSO_3 + HA$ | (3a) |
|---|---|---|
| Transfer: | $RNH_3A(\text{org}) + NaHSO_3(\text{aq}) \rightarrow RNH_3HSO_3(\text{org}) + NaA(\text{aq})$ | (3b) |
| Decomposition: | $RNH_3HSO_3(\text{org}) \rightarrow RNH_2(\text{org}) + H_2O + SO_2 \uparrow$ | (3c) |
| Recontact: | $RNH_2(\text{org}) + HA(\text{aq}) \rightarrow RNH_3A(\text{org})$ | (3d) |
| | $NaA(\text{aq}) + RNH_3A(\text{org}) + SO_2(\text{stack} \rightarrow NaA(\text{aq}) + RNH_3A(\text{org}) + SO_2 \uparrow$ | (3e) |

|                    |                  |       | -continued         |                      |
|--------------------|------------------|-------|--------------------|----------------------|
| (scrubbing agent)  | (transfer agent) | gas)  | (regenerated scrubbing agent) | (regenerated transfer agent) |

Reaction equations (3a)–(3e) demonstrates a preferred procedural mode in which the anion of the amine salt as used in the transfer reaction corresponds to the anion of the scrubbing agent, i.e., $A^-$. Suitable anions which are used in such process include, for example, the acetate ion.

When an anion $B^-$ differing from the anion $A^-$ of the scrubbing agent characterizes the amine salt transfer reactant, the reaction steps of the process may be characterized as follows:

In yet another type of process mechanism which may be encountered upon variation of a specific common anionic species used in the scrubbing agent and transfer reactant, the situation in which this anion is multivalent (e.g., bivalent) may be considered. In such case, the several steps of the process may be characterized by two different reactions schemes. First:

| Scrubbing: | $Na_2A + H_2O + SO_2(stack) \rightarrow NaHA + NaHSO_3$ | (5a) |
|---|---|---|
| Transfer: | $(RNH_3)_2A(org) + NaHSO_3(aq) \rightarrow (RNH_3)_2SO_3(org) + NaHA(aq)$ | (5b) |
| Decomposition: | $(RNH_3)_2SO_3(org) \rightarrow 2RNH_2(org) + H_2O + SO_2 \uparrow$ | (5c) |
| Recontact: | $2RNH_2(org) + 2NaHA(aq) \rightarrow (RNH_3)_2A(org) + Na_2A(aq)$ | (5d) |

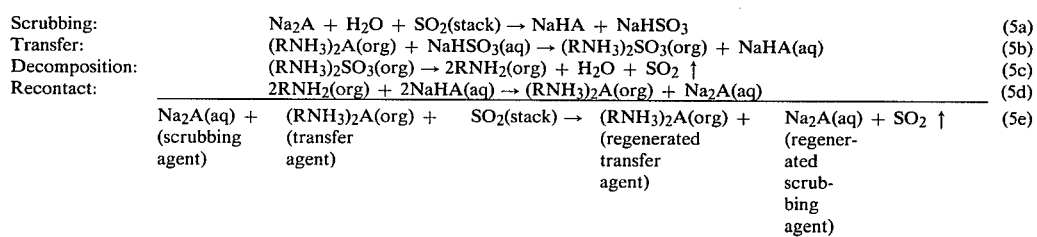

Alternatively, the reactions can also proceed as follows:

| Scrubbing: | $2Na_2A + 2H_2O + 2SO_2(stack) \rightarrow 2NaHA + 2NaHSO_3$ | (6a) |
|---|---|---|
| Transfer: | $(RNH_3)_2A(org) + 2NaHSO_3(aq) \rightarrow 2RNH_3HSO_3(org) + Na_2A(aq)$ | (6b) |
| Decomposition: | $2RNH_3 \cdot HSO_3(org) \rightarrow RNH_2(org) + 2H_2O + 2SO_2 \uparrow$ | (6c) |
| Recontact: | $2RNH_2(org) + 2NaHA(aq) \rightarrow (RNH_3)_2A(org) + Na_2A(aq)$ | (6d) |

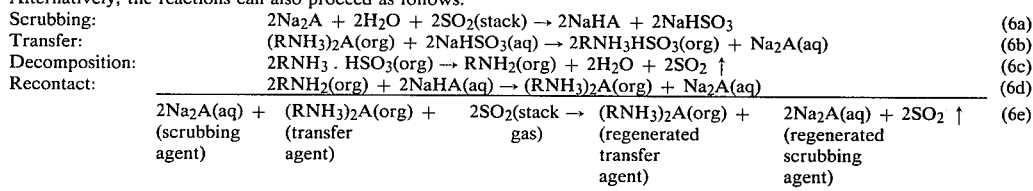

It will be perceived that the processes which are postulated to occur by the two mechanisms described above differ in what occurs in the transfer reaction

| Scrubbing: | $NaA + H_2O + SO_2(stack\ gas) \rightarrow NaHSO_3 + HA$ | (4a) |
|---|---|---|
| Transfer: | $RNH_3B(org) + NaHSO_3(aq) \rightarrow RNH_3HSO_3(org) + NaB(aq)$ | (4b) |
| Decomposition: | $RNH_3HSO_3(org) \rightarrow RNH_2(org) + H_2O + SO_2 \uparrow$ | (4c) |
| Recontact: | $RNH_2(org) + HA(aq) \rightarrow RNH_3A(org)$ | (4d) |

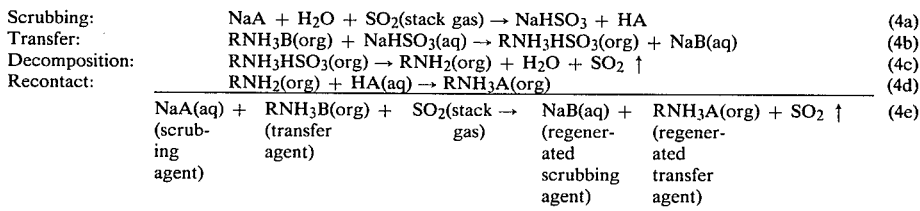

The foregoing reactions represent the reactive occurrences at each step of the process when it is initially carried out, i.e., the first pass. After a few cycles of operation, however, an equilibrium will be established in which an equilibrium mixture of the salts NaA and NaB are functioning as the scrubbing agent, and an equilibrium mixture of the amine salts $RNH_3A$ and $RNH_3B$ is functioning as the transfer reactant. This points to the fact that in order for the process to operate fully effectively when a different anion characterizes the transfer reactant, the pKa value of the acid from which that anion is derived should fall with the pKa ranges hereinbefore indicated as desirable for the weak acid from which the scrubbing agent is derived. Thus, the parent acid of the anion which characterizes the amine salt transfer reactant at the outset of the process should be at least 3.0, and is preferably above 5.0 and most preferably between about 7.0 and 8.0.

constituting the second step of the process. In the first characterization of the process, it will be perceived that the normal amine sulfite $(RNH_3)_2SO_3$ is the only organic sulfite yielded by the transfer reaction 5(b). In the second process characterization, however, the acidic amine sulfite $(RNH_3HSO_3)$ is the organic sulfite product resulting from the transfer reaction 6(b). In actual practice, both the first and second reaction mechanisms concurrently occur so that there is a mixture of the normal sulfite and the acidic amine hydrosulfite formed in the transfer reaction.

In the case where the scrubbing agent and the transfer reactant have different bivalent anions, $A^=$ and $B^=$, the occurrent reactions may again be described by two different reaction schemes, which actually represent two concurrently ongoing reactions occurring as the process is carried out, and differing principally in what commences to occur at the transfer reaction step of the process.

| Scrubbing: | $Na_2A + H_2O + SO_2(stack\ gas) \rightarrow NaHA + NaHSO_3$ | (7a) |
|---|---|---|
| Transfer: | $(RNH_3)_2B(org) + NaHSO_3(aq) \rightarrow (RNH_3)_2SO_3(org) + NaHB(aq)$ | (7b) |
| Decomposition: | $(RNH_3)_2SO_3(org) \rightarrow 2RNH_2(org) + H_2O + SO_2 \uparrow$ | (7c) |
| Recontact: | $2RNH_2(org) \quad NaHA(aq) \quad \tfrac{1}{2}(RNH_3)_2A \quad \tfrac{1}{2}Na_2A$ | (7d) |

-continued

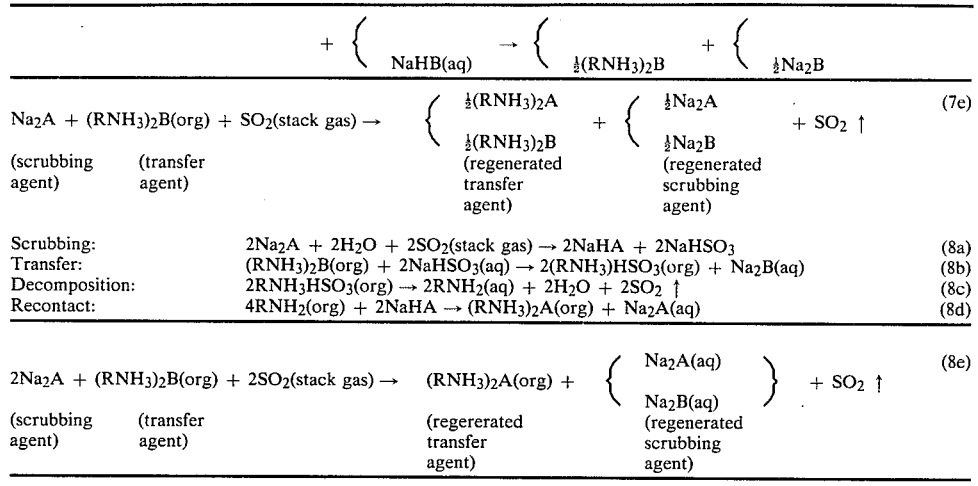

| Scrubbing: | $2Na_2A + 2H_2O + 2SO_2(\text{stack gas}) \rightarrow 2NaHA + 2NaHSO_3$ | (8a) |
|---|---|---|
| Transfer: | $(RNH_3)_2B(\text{org}) + 2NaHSO_3(\text{aq}) \rightarrow 2(RNH_3)HSO_3(\text{org}) + Na_2B(\text{aq})$ | (8b) |
| Decomposition: | $2RNH_3HSO_3(\text{org}) \rightarrow 2RNH_2(\text{aq}) + 2H_2O + 2SO_2 \uparrow$ | (8c) |
| Recontact: | $4RNH_2(\text{org}) + 2NaHA \rightarrow (RNH_3)_2A(\text{org}) + Na_2A(\text{aq})$ | (8d) |

$$2Na_2A + (RNH_3)_2B(\text{org}) + 2SO_2(\text{stack gas}) \rightarrow (RNH_3)_2A(\text{org}) + \left\{ \begin{array}{c} Na_2A(\text{aq}) \\ Na_2B(\text{aq}) \end{array} \right\} + SO_2 \uparrow \quad (8e)$$

(scrubbing agent) (transfer agent) (regererated transfer agent) (regenerated scrubbing agent)

Again, after several cycles through the process with recirculation to the scrubbing zone of the regenerated scrubbing agent, and to the transfer reaction zone of the transfer reactant, an equilibrium condition is established in which the scrubbing agent is an equilibrium mixture of $Na_2A$ and $Na_2B$, and the transfer reactant is an equilibrium mixture of $(RNH_3)_2A$ and $(RNH_3)_2B$. Again, it is desirable that the anion $B^=$ be derived from a parent acid having the same pKa range as previously specified, which range will, of course, be that which is to characterize the scrubbing agent weak acid precursor.

I have now further discovered that the desirability that the anionic portion of the transfer agent be derived from an acid having the referenced pKa value can be obviated by using certain proton-containing acidic anions, such as can be represented by the anions $HA^-$ and $HB^-$. Where the transfer reactant includes such anions, the pKa value of the parent acid from which such anions are derived can be less than 3.0. Under these conditions, the process will operate as follows:

ing will yield a cumulatively greater amount of amine hydrosulfite product than will the concurrent occurrence of reactions (5b) and (6b), or the concurrent occurrence of reactions (7b) and (8b) at the transfer reaction phase of the process. As previously pointed out, the amine hydrosulfite product is to be preferred over the amine sulfite species since the hydrosulfite is more easily and readily decomposed, and the overall process is less susceptible to side reactions and oxidation. Generally suitable types of the anions $A^=$, $HA^-$, $B^=$ and $HB^-$ and $HPO_4^=$, $H_2PO_4^-$, $Hcitrate^=$ and $H_2citrate^-$. Reactions of the type of (9e) which will lead to the formation of amine sulfite will be minimal unless a large amount of amine is utilized in the process.

In sum, with respect to the anionic component of the amine salt used as the transfer reactant, its negative ion component, $A^-$ or $A^=$, should be derived from an acid whose pKa value is not less than 3.0, and preferably not less than 5.0. Most preferably this pKa value is between 7.0 and 8.0. A proton-containing anion such as the spe-

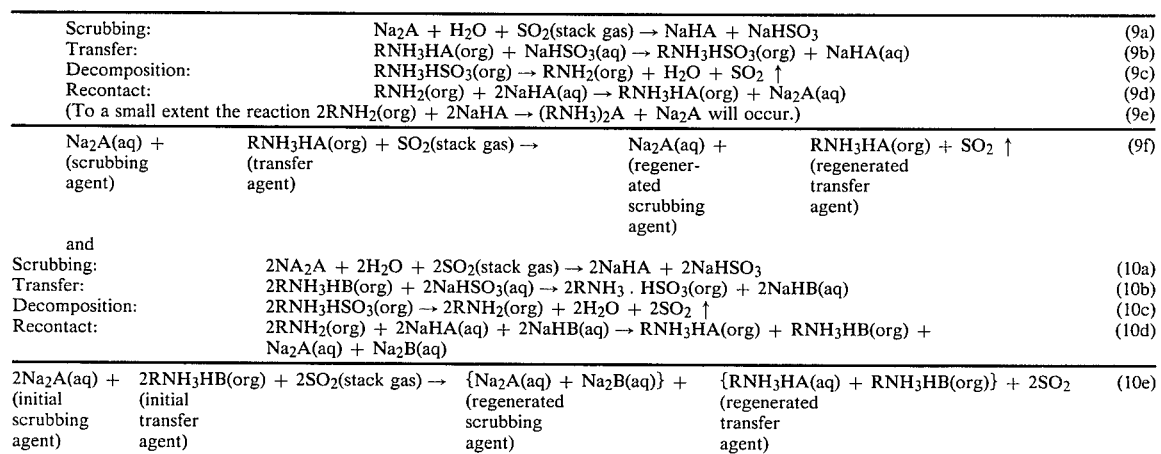

The procedure entailing the reactions set forth as (9a)–(9e) and (10a)–(10e) above in fact portray the use of a preferred form of the transfer agent used in the transfer reaction, i.e., the proton-containing anionic species, since, as will be seen by referring to reaction equations (9b) and (10b), ultimate equilibrium conditions involving concurrent ongoing of these two reactions in the course of recycling and continuous processcies $HA^-$, however, may be used even though it is derived from a parent acid having a pKa value of less than 3.0.

In addition to the characteristics of the amine salt transfer reactant hereinbefore described, it is further desirable that the amine salt be soluble in a water-immiscible organic solvent, or itself constitute an organic liquid which is immiscible with water. Moreover, the transfer agent should not contain any negative component which is chemically reactive with SO₂ or sulfite ions. Thus, for example, the hydrosulfide, ion, though it would meet the requirements of the pKa of the parent acid from which derived, as hereinbefore described, is nevertheless not a suitable anionic component of the transfer reactant because it interacts with sulfur dioxide to form sulfur.

Considering in greater detail the degree of water immiscibility of the transfer reactants, amine salts suitable for use as the transfer reactant preferably have a water solubility less than 5 gms per 100 gms water at 25° C. Such amine salts can usually be derived from a parent amine having a water solubility no larger than 0.2 gms per 100 gms of water at 25° C. Such an amine will contain a hydrophobic group, such as a multi-carbon hydrocarbon group. Typical of amines containing such a multi-carbon hydrocarbon group are long chain alkyl primary, secondary and tertiary amines, or long chain quarternary ammonium salts. The function of the long chain alkyl group, as previously stated, is essentially to render the amine hydrophobic (i.e., organic soluble) rather than hydrophilic (i.e., water soluble). To fulfill this functional requirement, the alkyl substitutents' of the nitrogen atoms in the transfer reactants, as here defined, can be straight chain or branched, and the hydrogen atoms attached to the carbon atoms of the carbon chain can be substituted in varying degree with substituents of structural or functional groups which are chemically inert with respect to the reactants and solvents encountered in the transfer reaction, as long as such substitution does not materially affect the desired attributes as discussed above.

In addition to alkyl groups of the type which are normally defined as saturated hydrocarbon chains, carbon chains (substituted or unsubstituted) with unsaturate bonds are also usable, since the presence of the unsaturation does not significantly affect the hydrophobic nature of the amine salt. However, the presence of unsaturated bonds must not materially change the chemical inertness or materially lower the ion transfer capacity of the amine salt. Cyclic amine salts in which the nitrogen atom is attached to a ring carbon atom and aromatic amine salts in which the nitrogen atom of the amine group is a part of the six-member ring are suitable, provided the transfer reactant has the other desirable attributes referred to above.

The substantial water immiscibility of the amine salt is necessary so that the regenerated scrubbing liquor from the transfer reaction can be separated directly from the organic phase and recycled to the scrubber. High water solubility indicates that higher leakage of the amine transfer reactant into the water phase will occur, or such leakage will occur to the regenerated aqueous scrubbing liquor. High leakage of this type is undesirable, even though the overall process is a closed process.

Generally, with aliphatic amine salts, suitable water-immiscible parent amines will have aliphatic substituents containing at least 12 carbon atoms. In the case of some highly branched amines (e.g., highly branched tertiary alkyl primary amines), however, the aliphatic groups may have as few as 8 carbon atoms and still exhibit sufficient water immiscibility. 1–4 dimethyl pentylamine, a C₇ alkyl amine, has a water solubility below 0.2 gm/100 gms water, and can also be used as parent amine of the amine salts in admixture with amines having 8 or more carbon atoms. The parent amines preferably do not contain more than 45 carbon atoms in the several alkyl substituents.

Although the hydrophobic multi-carbon hydrocarbon groups are generally derived from the parent amine, when the transfer, decomposition and recontact steps are combined in a single step, this multi-carbon hydrocarbon group may be provided by the acid portion of the amine salt. Thus, an amine salt of palmitic acid can be water insoluble because palmitic acid is water insoluble.

In order to consider in greater detail the sulfite ion transfer capability of transfer reactants useful in the present invention, a parameter referred to as "G value," and hereinafter defined, can be advantageously employed as a measure of transfer capability. It is generally preferred to use a transfer reactant having a high "G value," thus attaining relatively high efficiency in effecting the transfer of sulfite anions from the salts present in the pregnant scrubbing solution to organo-sulfite compounds of the type heretofore described.

In general, any organo-nitrogen salt derived from a characteristic basic functional group of the type $-NH_2$, $>NH_2$, $>N-$ and

is characterized by some degree of basicity, and thus displays some "transfer capability" for hydrosulfite anions. The "transfer capability" can be defined in several ways, such as in terms of the distribution of sulfite ions as between the organic and aqueous phases present in the transfer reaction system. A more suitable mode of defining the "transfer capability" of the transfer reactant, however, is in terms of a "G value," which is defined as, $$G = \frac{\text{Equivalents of sulfur in a kerosene base organic phase}}{\text{Total moles of amine in kerosene}} \quad (11)$$

It will be seen in referring to Equation (11) that the G value is an expression of the efficiency of transfer of sulfite ions from the aqueous to the organic phase, based upon the degree to which all of the moles of amine cations present in the organic phase have become bonded to anions containing sulfur. Because kerosene is a relatively inexpensive organic solvent which works well in carrying out the transfer reaction, it has been used as the basis for computing the G value for practical reasons. It should be pointed out, however, that G values can be calculated in reference to other solvents equally expediently.

The numerical magnitude of the G value depends upon the initial hydrosulfite concentration in the aqueous phase and the initial amine concentration as amine salt in the organic phase in the transfer experiment. When these conditions are kept constant, the G value adequately measures the effectiveness of an amine salt in effecting hydrosulfite transfer. For this purpose, the G value can be conveniently determined as follows: 10 ml of an aqueous solution containing 3.37 mmols of sodium hydrosulfite per ml is shaken with 16.85 mmols of the long chain amine as amine salt dissolved in an equal volume of kerosene in a separatory funnel for a period of five minutes. The two layers are allowed to separate, and the sulfite content of the organic layer is determined. The G value can then be calculated according to Equation (11).

The selection and use of a transfer reactant having a relatively high G value affords a high transfer per pass (during the cyclic operation of the process), and a correspondingly reduced volumetric recirculation need for the regenerated transfer reactant and its solvent (if one is used) in the operation of the process. The significance of this practical advantage becomes more apparent when it is considered that in the case of transfer reactants having long chain aliphatic substituents, the recirculation of the large molecule transfer reactants entails a relatively high cost of recirculation in relation to the chemical activity of each molecule of the transfer reactant employed.

In reference to the characteristic G values of those transfer reactants which can be used to advantage in the process of the present invention, I prefer to employ transfer reactants having a G value exceeding 0.15. Above this minimum G value, more suitable results are obtained where the G value is higher than 0.3, and the best results are achieved if such transfer reactant has a G value exceeding about 0.4. As will be hereinafter discusssed, however, by carrying out the transfer, decomposition and recontact steps simultaneously in a single reaction zone, a relatively high G value is not so crucial.

In the selection of the transfer agent, organic solubility is also an important consideration. Where the preferred mode of carrying out the present invention is in use, and the transfer reactant is dissolved and recirculated in a suitable organic solvent, it may be noted that the organic solubility of the transfer reactants of the type described can be improved by adding to the organic solvent, as a transfer reactant solubility promoter, from about 3 to 5 weight percent of a long chain alkanol (containing, for example, from about 12 to about 24 carbon atoms).

Within the broadly defined range of chain length and water immiscibility characteristics hereinbefore set forth, it is preferred to use amine salts derived from parent amines having a molecular weight in the range of from about 180 to about 650.

There are a number of parent amines which satisfy the broad criteria above described, as well as the desiderata employed in the selection and use of a preferred or most suitable parent amines from amine salt transfer reactants as set forth above. A partial listing of commercially available aliphatic amines which serve well as parent amines of amine salts includes: an isomeric mixture of tertiary alkyl primary amines each having a chain length in the $C_{18}$–$C_{22}$ range, and sold under the trade name Primene JMT; an isomeric mixture of tertiary alkyl primary amines each having a chain length in the $C_{12}$–$C_{14}$ range and sold under the trade name Primene 81R; a mixture of N-dodecenyl-N-trialkylmethyl amines each containing from 24 to 27 carbon atoms and sold under the trade name Amberlite LA-1; and a mixture of N-lauryl-N-trialkylmethyl amines each containing from 24 to 27 carbon atoms, and sold under the trade name Amberlite LA-2 (all the foregoing are marketed by Rohm & Haas Company of Philadelphia, Pennsylvania); methyl di-(n-octyl) amine and 1-(3-ethylpentyl)-4-ethyloctyl amine. A suitable quarternary amine salt can be derived from a mixture of trialkylmethyl ammonium chloride compounds in which the alkyl substituents are straight chain alkyl groups containing from 8 to 10 carbon atoms. This chloride compound mixture is sold commerically under the trade name Aliquat 336 by General Mills Chemicals, Inc. of Minneapolis, Minnesota.

As previously indicated, the transfer reactant must be an organic-soluble compound, or itself be a liquid capable of providing a distinct organic phase when contacted with the spent aqueous scrubbing liquor. It is preferred to place the organic transfer reactant in an organic solvent for carrying out the transfer reaction. Solution in an organic solvent improves the flow characteristics of the amine salt and increases the speed of phase disengagement. Organic solvents which can be effectively employed include water-immiscible alcohols, ketones, ethers and esters, and hydrocarbons such as benzene, toluene, xylene, kerosene, heavy naphtha and light gas oil. The solvent selected and used should preferably be non-toxic, of relatively low volatility, substantially water insoluble and chemically inert toward the reactants and any other solvents in the zones in which the transfer reactions are carried out. Kerosene boiling in the range from about 350° F. to about 600° F. is the preferred solvent.

C. Decomposition Step

As explained in my U.S. Pat. No. 4,101,643, the amino-sulfur bearing compounds resulting from the transfer reaction can be decomposed by subjecting the pregnant organic phase derived from the transfer reaction to elevated temperature. I have now further determined that the presence of a substantial amount of water during the thermal decomposition enhances the decomposition apparently by a catalytic effect. The decomposition reaction occurring upon heating may be formally represented by equations

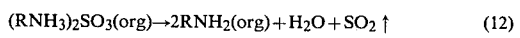

$$(RNH_3)_2SO_3(org) \rightarrow 2RNH_2(org) + H_2O + SO_2 \uparrow \qquad (12)$$

or

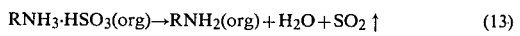

$$RNH_3 \cdot HSO_3(org) \rightarrow RNH_2(org) + H_2O + SO_2 \uparrow \qquad (13)$$

This occurs when the organic phase derived from the transfer reaction, and containing amine sulfite and hydrosulfite, is heated to a temperature exceeding about 70° C. In the case of the sulfite and hydrosulfite of Primene JMT, the organic phase is preferably heated to about 90° C. to effect the decomposition of the sulfite compounds. A stripping gas, such as steam or methane, is preferably admitted to the hydraulic thermal decomposition zone concurrently with the heating, and is passed through the organic liquid containing the amine sulfites to provide a stripping action aiding in carrying the product sulfur dioxide out of the thermal decomposition zone. In this way, the sulfur dioxide is produced in concentrated form and may be recovered as such. Alternatively, it can be reduced to elemental sulfur or converted to sulfuric acid by processes well known and understood in the art. The upper limit of the temperature to which the amine sulfite and hydrosulfites can be heated is dictated by the practical level or value at which chemical deterioration of the amine will commence.

In explanation of the observed decomposition reactions (12) and (13), it appears plausible to assume that long chain amine compounds, like ammonia, lose basicity rapidly as temperature is increased, and hence at the higher or elevated temperatures, the binding force of the amine cations to the sulfite and hydrosulfite ions becomes rather weak, with the result that these salts decompose readily.

I have now discovered that water promotes the decomposition reaction, i.e., at a certain temperature level, the decomposition reaction is faster if water is present. The precise mechanism of this catalytic effect of water is not known; however, the similar effect of water on the decomposition of some ammonium salts has been well documented in the literature. For instance, it is well known that diammonium phosphate decomposes, upon heating, into ammonia and monoammonium phosphate. The dissociation pressure of the dry solid is about 5 mm of Hg at 100° C. and 300 mm at 125° C. For a saturated aqueous solution (5.4 molal), the equilibrium partial pressure of ammonia at 25° C. is about 1.06mm and this vapor pressure of ammonia from the saturated aqueous solution is about 100 times the calculated value of the dry salt at 25° C.

A similar situation apparently prevails in amine sulfite decomposition. However, to fully realize the catalytic action of water, a large amount of water, i.e., not less than one-third of the volume of the organic phase, must be present; otherwise the catalytic effect will be diminished.

In this regard, the Wiewiorowski patent to which reference was earlier made herein proposes the use of steam stripping to remove $SO_2$ from an organic solvent which carries amines. Steam distillation does not, however, imply the presence of any significant amount of water in the system being stripped. It should be noted that the distillation contemplated by Wiewiorowski is preferably carried out at from 110° C. to 130° C. At these temperature levels, no steam will condense unless the pressure in the still exceeds approximately 1.5 atmospheres or 2.7 atmospheres, respectively. No mention of pressurized distillation is made, however, in the Wiewiorowski patent.

D. Recontacting Step

In the final step of the process, the partially regenerated aqueous scrubbing solution from the second or transfer step and the organic phase from the third or hydraulic/thermal decomposition step, and containing free amine, are mixed intimately in a recontacting step. In the "recontact" step, some protons from the scrubbing solution combine with the amine from the hydraulic/thermal decomposition step forming the amine salt. Thus in the above reaction). As discussed in my U.S. Pat. No. 3,984,529, it is of advantage to select, as scrubbing reactants, salts derived from weak acids having a pKa value in the range of from about 5 to 10, and more preferably from about 7 to about 8.

As previously indicated herein, when an amine salt is used as the transfer reactant in the process of the invention, the transfer product undergoes decomposition much more readily and completely at certain temperature levels than does the comparable product of the transfer reaction where an amine is used as the transfer reactant. This can be illustrated by the following reactions which are thought to occur:

Amine Transfer
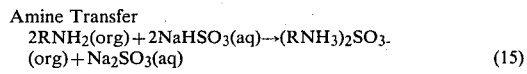
(15)

Amine Salt Transfer
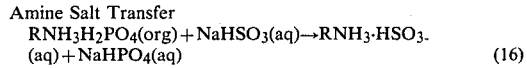
(16)

This is because in reaction (15), protons are consumed by combining with amine to form $RNH_3^+$ by the reaction $RNH_2 + H^+ \rightarrow RNH_3^+$. Since the amine hydrosulfite decomposes more readily than a normal salt, the amine salt thus yields a more readily decomposable transfer product.

The most preferred amine salts are the proton-containing amine acid salts because the acid salts lead to the formation of more amine hydrosulfite and less amine normal sulfite as may be seen by comparing reactions (5b), (6b), (7b) and (8b) with reactions (9b) and (10b).

Another important reason for using an amine acid salt as the most preferred transfer reactant is that only one amine radical, rather than two, is needed to combine with one sulfite radical. Thus, the required inventory of amine salt necessary to carry out the transfer reaction in order to transfer a given quantity of sulfite ions can be effectively reduced by a factor of two.

Moreover, I have determined that the provisions of an acidic environment in the decomposition zone improves the efficiency of decomposition of the transfer raction product. Acidic salts are preferably employed for accomplishing this result. For example, when phosphate salts are used as the scrubbing agent, and amine hydrogen phosphate is used as the transfer reactant, a preferred mode of operation includes the utilization of an excess amount of sodium dihydrogen phosphate in the scrubbing solution, and the reactions which occur may be represented as follows:

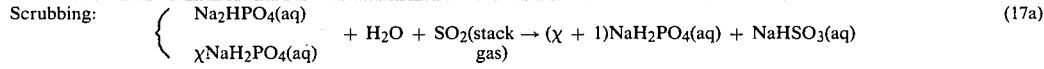
(17a)

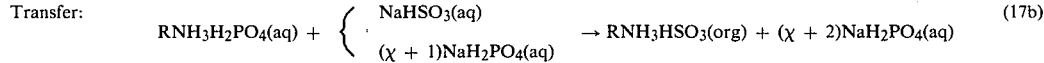
(17b)

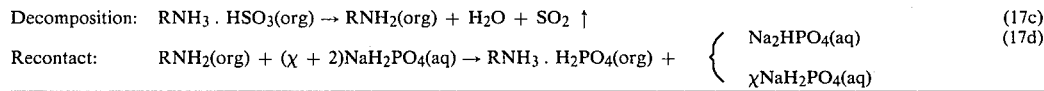
(17c)
(17d)

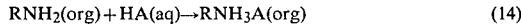
(14)

Referring to equation (14), the extent to which this reaction will take place depends upon the basicity of the amine and the pKa value of the parent acid of the alkali metal salts involved in the reaction (i.e., parent acid HA Here X in practical applications may range from 0.1 to 9, and preferably ranges between 1 and 3. $NaH_2PO_4$ may be added directly or may be indirectly generated by adding phosphoric acid.

Whether the transfer, decomposition and recontact reactions are carried out separately or in a single step, an advantage of the presence of a large amount of $NaH_2PO_4$ is that it tends to push reactions of the type (9d), (10d) and (17d) toward completion. These reactions lead to the formation of amine hydrosulfite which decomposes more readily. The formation of amine sulfite via the type of reaction (9e) is minimized because of the presence of the large amount of $NaH_2PO_4$.

Moreover, where the ion-transfer, decomposition and recontact steps are carried out concurrently, the aqueous phase provides the necessary supporting aqueous medium in order to provide the acidic environment which has been indicated above to be desirable for carrying out the decomposition reaction. Thus, as indicated by way of example above, provision of an excess amount of sodium dihydrogen phosphate in the aqueous scrubbing solution, so that this acidic salt is carried over into the pregnant scrubbing liquor, and then ultimately into the common zone in which the transfer, decomposition and recontact reactions all occur, keeps the pH of the aqueous phase in this zone at a relatively lower level during the course of the decomposition reaction, and thus effectively promotes the decomposition of amine hydrosulfite in the organic phase.

Whether the transfer, decomposition and recontact steps are carried out separately and in sequence, or concurrently in a common reaction zone, it is beneficial to provide an inert atmosphere, at least in the case of the transfer and decomposition reactions. Provision of such inert atmosphere, as by blanketing the reaction(s) with nitrogen or other inert gas, functions to eliminate undesirable air oxidation of the sulfites to sulfate salts, which then must be dealt with through a separately provided processing scheme.

The provision of the desirable inert atmosphere is, of course, more readily and easily accomplished where the transfer, decomposition and recontact steps are carried out concurrently in a common zone. This is but one of many advantages which are attained by practicing the process of the present invention in a two-step fashion, in the sense of providing a scrubbing reaction followed by a second step which combines the transfer, decomposition and recontact reactions in a single reaction zone, and carries them out concurrently. Additionally, when the aqueous phase from the scrubbing reaction and the organic phase from the transfer reaction are not separated from each other prior to effecting the decomposition of the amine sulfite, the water in the aqueous phase serves as a catalytic agent effectively increasing the efficiency of decomposition of the amine salt. It is, of course, then unneccessary to provide a separately added quantity of water at the decomposition phase of the process.

When the process is operated with disodium monohydrogen citrate as the scrubbing agent, the acid environment which tends to hasten the decomposition of amine hydrosulfite generated from the transfer reaction may be conveniently provided by monosodium dihydrogen citrate. When the process is operated with NaA where $A^-$ is a monovalent weak acid anion (e.g. acetate anion) the acid environment may be conveniently provided for by the parent acid HA (e.g. acetic acid). The choice among individual systems depends on many factors. Phosphates which are inorganic anions are inherently more stable than either citrates or acetate. On the other hand, the spent scrubbing liquor from either a citrate or acetate system releases $SO_2$ more readily.

With the unpromoted phosphate system, the vapor pressure of $SO_2$ is so low that steam stripping must be considered as impractical. However, when the system is promoted by using an amine salt as a transfer agent, the decomposition of $SO_2$ is so much enhanced that the promoted system can be considered as a practical system for large scale operations.

An acid salt or an acid having an anion differing from the anion used in the scrubbing salt can be used to advantage to acidify the environment of decomposition. Thus, when disodium monohydrogen phosphate is used as the scrubbing agent, sodium dihydrocitrate, or HA, (where $A^-$ is a monovalent weak acid anion) may be used to provide the acid environment. Similarly, when NaA is used as a scrubbing agent, HB (where $B^-$ is a monovalent weak acid anion) may be used. In these cases, to be fully effective, the pK of $H_2$citrate$^-$, HA and HB, (i.e. the acidic anion of the acid salt or the acid itself which is used to provide the acid environment to promote the decomposition of amine hydrosulfite generated from the transfer reaction) should have a pK value greater than 3.0, preferably above 5.0 and most preferably between 7.0 and 8.0.

The provision of an acid environment at the situs of decomposition also appears to suppress undesirable side reactions, including air oxidation.

Another significant advantage of carrying out the transfer, decomposition and recontact reactions concurrently and in a common zone is that as a result of the copresence of the organic phase and the aqueous phase, residual sulfite not transferred and remaining in the aqueous phase when the transfer reaction was carried out separately has been discovered to also substantially decompose and release $SO_2$. Therefore, the per pass decomposition yield of sulfur dioxide is substantially increased. To illustrate, I have found that when an aqueous solution containing 1.7 moles of $NaHSO_3$ and 3.4 moles of $NaH_2PO_4$ is extracted by an organic solution containing 1.7 moles (LA-2) dihydrogen phosphate dissolved in an equal volume of kerosene, only 59% $SO_2$ gas is extracted into the organic phase. However, if the aqueous solution and the organic solution are stripped by nitrogen gas together, as much as 78.6% $SO_2$ gas is recovered. This means that if the extraction, organic layer decomposition and recontact steps are to be carried out separately using these two solutions, the overall $SO_2$ gas yield cannot exceed 59%, but if the extraction, decomposition and recontact are carried out in one single step in a common zone, the $SO_2$ gas yield can be as high as 78.6%. This experimental result, which suggests that the presence of amine salts greatly facilitates the recovery of $SO_2$ from a sodium hydrosulfite solution, is rather unexpected. Although not wishing to be bound by such explanation, it appears that when the transfer-decomposition-recontact reactions are to be carried out in a common reaction zone, a dynamic situation prevails which will allow the transfer-decomposition-recontact reaction to occur repeatedly until a large amount of $SO_2$ is released. The promotion in $SO_2$ release by amine salts are further summarized in FIG. 1 which will be hereinafter explained.

Yet another advantage of carrying out the three reaction steps concurrently and in a common zone, and one which is due in substantial part to the presence of the aqueous layer therein and the observed decomposition of any non-transferred sulfite present in the aqueous layer, is that it is possible because of the dynamic situation which prevails, to use as transfer reactants, amine salts which have a relatively lower G value, i.e., weaker or lesser basicity. In other words, efficiency of ion-transfer to the organic phase becomes less necessary in order to achieve the extent of sulfur dioxide recovery which is sought upon decomposition.

Finally, when the three reactions are carried out concurrently in a common zone, the overall process is considerably simplified and substantial savings can be realized in both the investment cost and operating cost. Additionally, it is then possible to very easily avoid air oxidation without expensive process procedures and equipment being needed in order to provide the necessary inert atmosphere at three different points in the process, rather than only at the common reaction zone.

It should be pointed out that when the three reactions are carried out concurrently in a common zone, several modes of operations are possible, and a preferred mode of operation is given hereinafter in Example 5 (and illustrated in FIG. 3) where both the pregnant scrubbing stream and the regenerated organic stream are precooled down to 70° F. before mixing. The mixed streams then enter into a common zone where the three reactions are carried out concurrently.

It should also be pointed out that it is not necessary that each of the salts which are utilized as the scrubbing agent and as the transfer agent, respectively, in the process of the present invention be derived from a patent acid having a pKa value within the range hereinbefore described. Either the parent acid of the scrubbing agent or the parent acid of the transfer reactant may be outside the pKa range specified. For example, if NaA is the scrubbing agent and RNH$_3$B is the transfer agent, under cyclic, steady operating conditions, the scrubbing agent will ultimately become a mixture of sodium salts which include both the A and B anions, and the transfer agent will likewise become a mixture of salts containing both anions. In such circumstances, either the anion A or the anion B may be derived from a parent acid which is outside the pKa range previously identified. In that event, the sodium salt (say NaA) of the anion whose parent acid has a pK value outside of the range specified (e.g. pK(HA)<3.0) may not itself be a very effective scrubbing salt, but the mixture NaA+NaB is still effective because NaB is an effective scrubbing salt.

Not infrequently, the gaseous mixture from which the sulfur dioxide is to be removed by the process of the present invention will also contain some sulfur trioxide. In this event, sulfate compounds will also be present in the spent scrubbing liquor following the scrubbing step. The sulfate level, in such circumstances, may be controlled and build-up prevented by subjecting a side stream split off from the regenerated scrubbing liquor to treatment with a calcium compound in the presence of the dissolved SO$_2$ liberated during the transfer-decomposition-recontact step. This SO$_2$ is, of course, derived from the decomposition of the amine sulfite product of the transfer reaction. The precipitated gypsum resulting from the reaction of the calcium compound with the sulfate compounds in the side stream is removed by filtration, and the filtrate is returned to the main body of the absorbent stream.

The presence of a substantial quantity of SO$_2$ in the side stream has several advantages. First, the sulfite ions in the side stream will form the hydrosulfite salt with calcium which is substantially water soluble in comparison to calcium sulfite which has very low solubility in water. Thus, the hydrosulfite will not be precipitated out with the sulfate ions and be removed. Moreover, the concentration of calcium ions that can be dissolved into the side stream increases, and thus facilitates the sulfate precipitation. Secondly, where a phosphate system utilizing phosphate salt as the scrubbing agent and a phosphate salt as the transfer reactant is employed, a large portion of the phosphate ions will form calcium dihydrogen phosphate [i.e., Ca(H$_2$PO$_4$)$_2$·H$_2$O] which, although only moderately soluble, will decompose at the temperature of hot water. Therefore, although a portion of the calcium dihydrogen phosphate will precipitate out with the calcium sulfate, the precipitate can be slurried and upon heating to 75° C.–200° C. under appropriate pressure so that the liquid phase is maintained, the calcium dihydrogen phosphate in the slurry will decompose as follows:

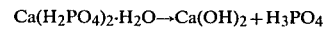

If the decomposition is conducted in the presence of regenerated scrubbing solution, the H$_3$PO$_4$ will react with regenerated monohydrogen phosphate to form sodium dihydrogen phosphate.

When the heated slurry is filtered, the calcium sulfate and lime will be filtered out, and phosphate in the form of NaH$_2$PO$_4$ will stay in the filtrate and can be recycled to the process.

Thirdly, in the case of a citrate system, i.e., when citrate salts are used as scrubbing agent and transfer reactant, a large portion of the citrate ion present will form calcium dihydrogen citrate which is more soluble than either calcium monohydrogen citrate or calcium citrate and therefore less loss of the citrate ion is incurred. Washing the precipitate with hot (85°–100° C.) water will further reduce the citrate loss. When a salt which includes a monovalent anion, such as sodium acetate, is used as a scrubbing agent, no problem arises because the calcium salt generally will be substantially soluble in water.

It is preferred to carry out the lime slurry treatment of the slip stream in the presence of SO$_2$ at low temperature and high pressure, because under these conditions, the solubility of SO$_2$ in water is favored. For example, under a partial pressure of SO$_2$ of approximately 650 mm Hg, the SO$_2$ solubility in water at 0° C. is about 20 gms of SO$_2$ per 100 gms of water. At 20° C., the solubility is slightly less than 10 gms/100 gms H$_2$O, and at 40° C., it is slightly less than 5 gms/100 gms H$_2$O. High SO$_2$ pressure will also increase the concentration of SO$_2$ in the solution. There is a linear relationship existent between the pressure level of the SO$_2$ and the SO$_2$ concentration in the aqueous solution.

In practical operation, the temperature may vary from about 90° C. (the typical temperature of the regenerated scrubbing liquor at the bottom of the steam stripper used to strip SO$_2$) to about 15° C., which is slightly above the saturation temperature of the pure SO$_2$ gas at 1 atmosphere. The pressure may vary from 14.7 psia (1 atmosphere) to about 70 psia, which is slightly below the saturation pressure of pure SO$_2$ at 32° C. If the sulfur dioxide in the gas stream from the steam stripper used for removing the SO$_2$ from the aqueous phase developed in the transfer reaction is less than 100% SO$_2$, a lower temperature than 15° C. and a higher pressure than 70 psia may be used as long as condensation of the SO$_2$ gas to a liquid is avoided. In fact, however, even avoidance of SO$_2$ liquefaction is not essential, since the process can operate with liquid SO$_2$ present. The presence of such liquid is avoided, however, since it complicates the process and does not offer any significant advantage.

The importance of the foregoing considerations of the amount of $SO_2$ dissolved in the slip stream is that an increase in the concentration of $SO_2$ in the aqueous solution lowers its pH and therefore renders it more acidic, which in turn favors the formation of the hydrogen salts of the particular anions involved in the scrubbing and transfer reaction mechanisms. Thus, as earlier explained, the formation of calcium dihydrogen phosphate, calcium dihydrogen citrate and calcium hydrosulfite is to be desired and is promoted by the higher acidity of the aqueous solution which contains a relatively high concentration of $SO_2$. As stated earlier, calcium dihydrogen citrate and calcium hydrosulfite are more soluble in water than the corresponding less acidic salts of calcium and the respective citrate and sulfite anions and the calcium dihydrogen phosphate can be readily thermally decomposed. Thus, the formation of these acidic salts is preferred.

To sum up, the practical operating range of temperature and pressure for a pure $SO_2$ stream are 15°–90° C., and 14.7 psia to about 70 psia. The limiting temperature and pressure will change if the sulfur dioxide stream contains less than 100% of the gas. The extent of change can be easily ascertained, however, by those having ordinary skill in the chemical and chemical engineering arts. Within these ranges, operating at low temperature and high pressure is always preferred from the standpoint of increasing the amount of sulfur dioxide dissolved in water.

It may be noted that when a mixed anionic system is used (e.g., a phosphate scrubbing agent and a citrate compound as transfer reactant), the phosphate can still be recovered into the solution by the thermal decomposition reaction referred to above in which the calcium dihydrophosphate salt is heated to yield lime and phosphoric acid.

Although lime has been referred to herein as the preferred source of calcium utilized in the desulfating of the process streams referred to above, other sources of calcium can be employed but are less desirable due to their relatively higher cost.

It should be pointed out that occasionally, a solid alkali metal salt rather than an aqueous solution of an alkali metal salt having the characteristics hereinbefore described may be used as the scrubbing agent. The reaction between the sulfur dioxide in the stack gas or other gaseous stream treated and the solid alkali metal salt occurs at a fast reaction rate because it is a Lewis acid—Lewis base type reaction. The reaction yields a complex under dry conditions, e.g., $Na_2HPO_4 + SO_2 \rightarrow Na_2HPO_4 \cdot SO_2$, whereas in the presence of a stoichiometric amount of water the hydrosulfite salt is produced by the reaction

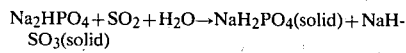

$Na_2HPO_4 + SO_2 + H_2O \rightarrow NaH_2PO_4(solid) + NaHSO_3(solid)$

In either case, the solid which is produced is collected after the scrubbing step and then dissolved in an appropriate amount of water to yield the aqueous solution which is then treated as the spent scrubbing solution stream developed in the process as it is more frequently carried out using an aqueous solution of an alkali metal salt as hereinbefore described.

Where the solid alkali metal salt is used in contrast to an aqueous solution of an alkali metal salt as hereinbefore described, the regenerated scrubbing solution yielded following the release of $SO_2$ after the transfer, decomposition and regeneration reactions may be dehydrated to again form the solid alkali metal salt to be used in the process, or it may be injected into the scrubbing zone as a concentrated solution. Dehydration is then caused to occur in the scrubbing zone and the ultimate product yielded by scrubbing will be either the complex or the hydrosulfite earlier described.

Some aspects of the present invention can be helpfully illustrated by the following examples.

EXAMPLE 1

In tets of the effectiveness of three different amine dihydrogen phosphate salts as transfer reactants, a 75 ml kerosene solution of the respective amine salt was mixed in a round bottom flask with 65 ml of an aqueous solution containing 0.77 mmol of sodium hydrosulfite per ml of the aqueous solution, and further containing 2.31 mmol of sodium dihydrogen phosphate per ml of the aqueous solution. The total amount of the respective amine salt (dihydrogen phosphate), in moles, in the organic phase was the same as the total amount of sodium monohydrogen sulfite in the aqueous phase.

In each test, the solutions were thoroughly mixed by stirring, and then the mixture was stripped with nitrogen gas at 87° C. for a period of 2 hours. The nitrogen gas was admitted to the reaction zone at a rate of approximately 1.3 ml/sec. The total $SO_2$ released during stripping was measured and is plotted in FIG. 1. For purposes of comparison and control, the same stripping procedure was carried out for the same period of time utilizing the aqueous solution containing the sodium monohydrogen sulfite and sodium dihydrogen phosphate salts in identical quantities. The kerosene was also included in the stripped mixture, but no amine salt was dissolved therein in this control test.

As stated earlier, the results depicted in FIG. 1 show that the presence of a primary amine (Alamine 336) dihydrogen phosphate, secondary amine (LA-1) dihydrogen phosphate or a quaternary ammonium salt (Aliquat 336) dihydrogen phosphate facilitates the release of $SO_2$ as compared to the control, which did not contain any amine.

EXAMPLE 2

Another experiment was conducted in the manner described in Example 1 using Alamine 336 dihydrogen citrate as the transfer agent. The result is shown in the dotted line in FIG. 1, and clearly shows that the amine salt having a different anion (dihydrogen citrate in the present instance) from the anion of the scrubbing salt (monophosphate in the present instance) also promotes the decomposition of sulfites with the release of $SO_2$ gas.

EXAMPLE 3

To test the effectiveness of amine dihydrogen citrate salt as a transfer reactant, and how it facilitates $SO_2$ production in a citrate salt scrubbing system, two additional tests were conducted in the manner described in Example 1. 65 ml of an aqueous solution containing 0.77 mmol of sodium hydrosulfite per ml of the aqueous solution and further containing 2.31 mmol of sodium dihydrogen citrate per ml of the aqueous solution was admixed with 75 ml of a kerosene solution of Alamine 336 dihydrogen citrate, of which the total amount in moles was the same as the total amount of sodium monohydrogen sulfite in the aqueous phase. The test was conducted in the same manner as described in Example 1. In a parallel control test, no amine salt was dissolved in kerosene. The results of these tests are summarized in Table I.

TABLE I

| Time | mmols SO$_2$ Evolved | |
|---|---|---|
| | Control (without Amine Salt) | Test (with Alamine 336 Dihydrogen Citrate) |
| ½ hr. | 19 | 30 |
| 1 hr. | 30.5 | 39.5 |
| 1½ hr. | 36 | 43.5 |
| 2 hr. | 39 | 45.5 |

The results clearly show that amine salt (i.e. Alamine dihydrogen citrate) facilitates the SO$_2$ regeneration.

EXAMPLE 4

Figure 2:
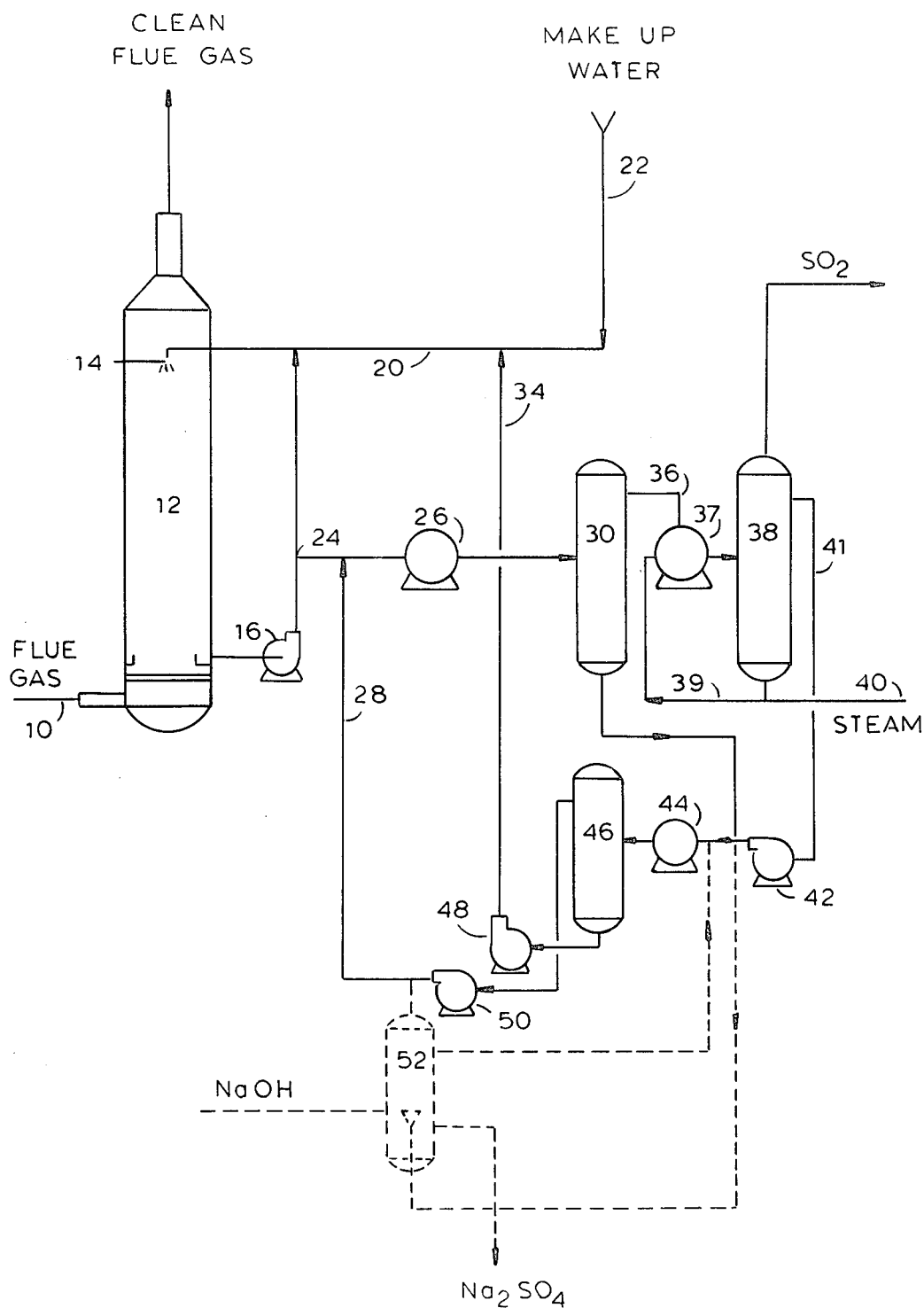
FIG. 2 is a schematic illustration of apparatus used in carrying out the process of the invention in one mode of operation.

Employing the system schematically illustrated in FIG. 2 of the drawing, approximately 240,000 standard cubic feet per minute of the flue gas generated by a 100 mw power plant which burns a 3 weight percent sulfur coal is treated. The flue gas is discharged from the plant at a temperature of 300° F., and is constituted, on a per minute basis, of essentially 4,190 lbs. of CO$_2$, 99.6 lbs. of SO$_2$, 598 lbs. of O$_2$, 14,120 lbs. of N$_2$ and 891 lbs. of water vapor. The flue gas is charged via a conduit 10 to the bottom of a conventional scrubber 12, and is moved upwardly in the scrubber countercurrently to a scrubbing solution discharged from a nozzle 14 in the top of the scrubber, and gravitating downwardly therefrom.

Though the schematic illustration of the scrubber does not illustrate its details of construction, it is of the type described in U.S. Pat. No. 3,984,529, and consists of three separate absorption stages. At each stage, the scrubbing solution flows downwardly from the top of the scrubber countercurrently to the flow of upwardly rising flue gas, and is collected in a sump situated at the bottom of each of the stages. From each sump, a portion of approximately 4/5ths of the scrubbing solution is recycled by a suitable pump to the top of the same stage, and another portion of approximately 1/5th of the liquid is charged to the top of the next lower stage. Thus, while a major portion of the scrubbing solution is constantly recycled within each stage, there is a minor portion of the scrubbing liquid passing downwardly from stage to stage and eventually withdrawn from the bottom of the scrubbing column for regenerating treatment.

About 90 percent of the SO$_2$ in the flue gas is removed by the scrubber column 12, and the clean flue gas, consisting essentially of 4,190 lbs. (per minute) of CO$_2$, 10.0 lbs. of SO$_2$, 598 lbs. of O$_2$, 14,120 lbs. of N$_2$ and 1,780 lbs. of water vapor is eluted from the top of the scrubbing column at about 128° F.

The material recycled from the sump at the bottom or lowermost stage within the column is recycled to the top of the scrubber column 12 by a suitable pump 16.

Regenerated scrubbing solution from a conduit 20 and produced in the manner hereinafter described is admitted via nozzle 14 to the top of the scrubber 12 each minute, and consists of 198.8 lbs. of disodium phosphate, 8.4 lbs. of monosodium phosphate, 25.3 lbs. of sodium sulfite, 0.73 lbs. of sodium hydrogen sulfite and 1634 lbs. of water at 70° F. To this stream, make-up water at 70° F. has been added at the rate of 890 lbs. per minute from the conduit 22.

A slip stream derived from the recycling scrubbing solution directed from the pump 16 to the top of the scrubbing column is passed through a conduit 24, and is constituted, on a per minute basis, of 19.9 lbs. of disodium phosphate, 160 lbs. of monosodium phosphate, 8.4 lbs. of normal sodium sulfite, 161.2 lbs. of sodium hydrogen sulfite and 744 lbs. of water. The slip stream is initially passed to a pump mixer 26, where it is intimately mixed with regenerated organic transfer reactant solution from the conduit 28 and constituted as hereinafter described.

The regenerated organic transfer reactant solution charged to the pump mixer 26 via conduit 28 consists (on a per minute basis) of 971.6 lbs. of diprimene monohydrogen phosphate, 142.6 lbs. of diprimene sulfite and 880.3 lbs. of kerosene, with the stream at 70° F. The volume ratio of the total Primene salts to kerosene present in the organic solution is 1.

From the pump mixer 26, the solution comprising an intimate mixture of both the aqueous and organic phases is charged to a holding column 30, where the two layers are permitted to separate. The aqueous layer, which is the partially regenerated scrubbing liquor, is constituted by 6 lbs. of disodium phosphate, 244.3 lbs. of monosodium phosphate, 8.4 lbs. of normal sodium sulfite, 30 lbs. of sodium hydrogen sulfite and 744 lbs. of water. This aqueous layer is sent to a recontact pump mixer 49 in which the protons from the aqueous stream are transferred to an amine organic stream.

The organic layer from the top of the holding column 30 is charged via a conduit 36 to another pump mixer 37. The material passed through the conduit 36 is constituted, each minute, by 97.3 lbs. of diprimene monohydrogen phosphate, 110.6 lbs. of monoprimene dihydrogen phosphate, 804.4 lbs. of diprimene sulfite, 106.1 lbs. of monoprimene hydrogen sulfite and 880.5 lbs. of kerosene. Also admitted to the pump mixer 37 is a regenerated water stream via conduit 39. Steam and optionally other stripping gases, such as methane or a suitable tail gas derived from a Claus reactor, are also admitted. The steam retains the temperature at a desirable level of about 90° C. From the pump mixer, the mixture enters another holding tank 38 where the two layers are allowed to separate. The aqueous layer, having approximately the same volume as the organic layer, is recycled via conduit 89 as above described. From the top of the holding tank 38, 89.9 lbs. of SO$_2$ per minute is continuously withdrawn, and can be liquefied, converted to elemental sulfur or converted to sulfuric acid.

Decomposition of the Primene sulfite and concurrent removal of sulfur dioxide regenerate the Primene JMT. The Primene stream constituting 290.6 lbs. of diprimene monohydrogen phosphate, 47.3 lbs. of diprimene sulfite, 668 lbs. of primene and 880 lbs. of kerosene is continuously withdrawn from stripping column 38 and by means of a pump 42, is admitted to 'recontact' pump mixer 44 in admixture with an aqueous layer from column 30. In the pump mixer 44, Primene is largely converted to diprimene monohydrogen phosphate which is used to scrub additional SO$_2$ from the stack gas. After the recontact, the mixture is again allowed to settle in a holding column 46 from which the aqueous layer is the regenerated scrubbing solution, as described previously, and the organic layer is the regenerated transfer reactant solution also as described previously. The regenerated scrubbing solution is withdrawn from the column by pump 48, and is returned to the scrubbing column. The regenerated transfer solution is recycled to the pump mixer 26 via a suitable pump 50 and conduit 28.

Reference has previously been made herein to the method employed for removing any sulfate which may be developed in the organic transfer reaction phase as a result of the presence of some $SO_3$ in the stack gas treated. Where Primene sulfate is present in the pregnant or spent organic transfer solution, it will normally not be thermally decomposed, as in the case of the sulfite, but will be carried out of the stripper column 38 with the regenerated transfer reactant solution. Since the sulfate content will continue to build up over a period of time, and thus inactivate increasing quantities of the Primene in relation to effective sulfite absorption capability, it is desirable to remove the sulfate ions from the regenerated transfer reactant solution. For this purpose, an absorption column 52 containing an alkaline solution, such as ammonium hydroxide or sodium hydroxide, is used for intimately contacting a slip stream split off from the recycled regenerated oganic transfer reactant discharged from conduit 41 and pump 42. The sulfate-containing organic solution passed through the column 52, and undergoing intimate liquid-liquid contact with the alkaline solution therein, is freed of the sulfate ion as a result of the formation of alkali sulfate. The organic phase ascends to the top of the column and separates from the more dense aqueous alkaline solution with which it is immiscible. From the top of the column, the sulfate-free slip stream is then remerged with the main stream of regenerated organic transfer reactant and passed to the 'recontact' pump mixer 44. The described expedient can be used in the practice of the process of the invention for keeping the organic transfer reactant sufficiently free of sulfate ions to prevent frequent down-time requirements, and to permit continuous operation of the process over extended periods of time.

EXAMPLE 5

Figure 3:
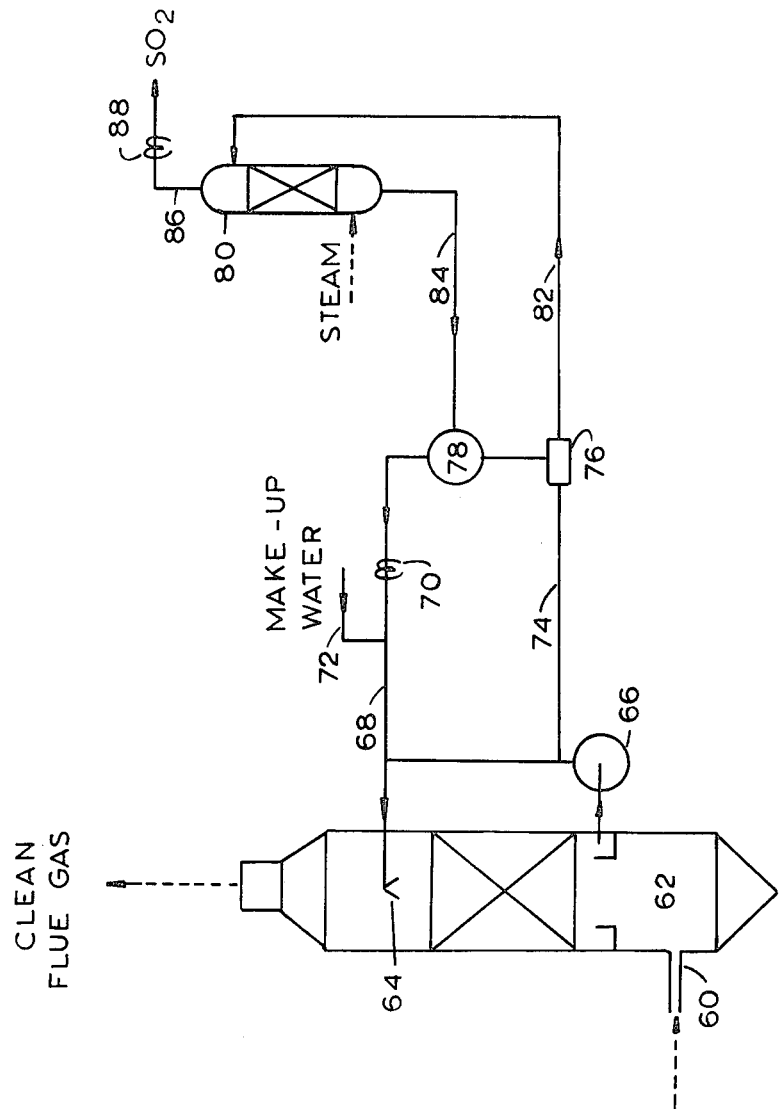
FIG. 3 is a schematic illustration of apparatus used in carrying out the process of the invention when the transfer, decomposition and recontact steps are concurrently performed in a single reaction zone.

The apparatus schematically shown in FIG. 3 is used for processing approximately 240,000 standard cubic feet per minute of flue gas generated by a 100 mw power plant which burns a 3 weight percent of sulfur coal. The flue gas is discharged from the plant at a temperature of 300° F. and is constituted, on a per minute basis, of essentially 4,190 lbs. of $CO_2$, 99.8 lbs. of $SO_2$, 598 lbs. of $O_2$, 14,120 lbs. of $N_2$ and 891 lbs. of water vapor. The flue gas is charged via a conduit 60 to the bottom of a conventional scrubber 62, and is moved upwardly in the scrubber countercurrently to a scrubbing solution discharged from a nozzle 64 in the top of the scrubber and gravitating downwardly therefrom.

The structure and operation of the scrubber 62 is the same as is described in Example 4. About 90 percent of the $SO_2$ in the flue gas is removed by the scrubber 62, and the clean flue gas, consisting essentially of 4190 lbs. (per minute) of $CO_2$, 10.0 lbs. of $SO_2$, 598 lbs. of $O_2$, 14,120 lbs. of $N_2$ and 1,780 lbs. of water vapor is eluted from the top of the scrubbing column at about 128° F.

The material recycled from the sump at the bottom or lowermost stage within the column is recycled to the top of the scrubber column 62 by a suitable pump 66.

Regenerated scrubbing solution from a conduit 68 and produced in the manner hereinafter described is admitted via nozzle 64 to the top of the scrubber 62, and consists, on a per minute basis, of 219.4 lbs. of disodium phosphate, 269.6 lbs. of monosodium phosphate, 36.5 lbs. of sodium hydrosulfite and 2,298 lbs. of water. This stream has previously been cooled down to 70° F. by a heat exchanger 70 and make-up water at 70° F. is added to this stream at the rate of 891 lbs per minute via conduit 72.

A slip stream derived from the recycling scrubbing solution directed from the pump 66 to the top of the scrubbing column is passed through a conduit 74, and is constituted, on a per minute basis, of 438.1 lbs. of sodium dihydrogen, 20 lbs. of disodium monohydrogen phosphate, 182.6 lbs. of sodium hydrogen sulfite and 2,298 lbs. of water. The slip stream which is precooled to 70° F. is initially passed to a pump mixer 76, where it is intimately mixed with regenerated organic transfer reactant solution from a centrifugal separator 78. This regenerated organic transfer reactaant solution, which consists of 760 lbs. (per minute) of mono (Alamine 336) dihydrogen phosphate, 30.6 lbs. of mono (Alamine 336) monohydrogen sulfite and 1,443 lbs. of kerosene, is also precooled to 70° F. The volume ratio of the alamine 336 salts to kerosene present in the organic solution is approximately 1:2. Alamine 336 is a trade name for tricaprylyl amine produced by General Mills Chemicals, Inc. of Minneapolis, Minnesota.

From the pump mixer 76, a stream which contains, on a per minute basis, 522.3 lbs. of monosodium dihydrogen phosphate, 20 lbs. of disodium monohydrogen phosphate 110 lbs. of sodium hydrogen sulfite, 2,298 lbs. of water, 443 lbs. of (Alamine 336) dihydrogen phosphate, 336 lbs. of (Alamine 336) monohydrogen sulfite and 1,433 lbs. of kerosene is conveyed by conduit 82 directly to a stripping column 80. Steam is admitted to the column 80 for stripping purposes, and retains the temperature at a level of about 85° C. From the top of the stripping column 80, 89.9 lbs. of $SO_2$ per minute is continuously withdrawn via conduit 86. Water is condensed from the $SO_2$ by a heat exchanger 88. The emitting gas, which contains approximately 95% $SO_2$, can be liquefied, converted to elemental sulfur or converted to sulfuric acid.

Inside the stripping column 80, the decomposition reaction and the recontact reaction occur concurrently. The presence of regenerated transfer agent also causes the simultaneous occurrence of the transfer reaction. This dynamic situation continues until most of the sodium hydrosulfite is decomposed. At the bottom of the stripping column, the regenerated aqueous stripping solution and the regenerated organic transfer solution are continuously withdrawn as a single stream via a conduit 84 and this stream is conveyed to the centrifugal separator 78 where the two phases are separated. The regenerated scrubbing solution, after cooling by the heat exchanger 70, is recycled to the scrubber 62, and the regenerated transfer solution is recycled to the pump mixer 76, all as previously described.

EXAMPLE 6

In Example 5, the scrubbing salt and the transfer salt utilized in the transfer reaction are characterized in having the same anion. The process of this invention, however, can be operated quite effectively where the scrubbing agent and the transfer reactant are compounds having different anionic species. To illustrate this, the process carried out generally, except as hereinafter described, in the same manner as that described in Example 5 is performed, using however, disodium monohydrogen phosphate as the scrubbing agent and using mono (Alamine 336) dihydrogen citrate as the transfer reactant. The process conditions and sequence of steps carried out are substantially identical to those described in Example 5. The apparatus schematically illustrated in FIG. 3 is utilized to process the same effluent gas which is charged to the scrubber at a rate of 240,000 scfm as generated by a 100 mw power plant burning a 3 weight percent sulfur coal. The flue gas is discharged from the plant at a temperature of 300° F. and, as stated in Example 5, is constituted, on a per minute basis, of 4190 lbs. of $CO_2$, 99.8 lbs. of $SO_2$, 598 lbs. of $O_2$, 14,120 lbs. of $N_2$ and 891 lbs. of water vapor. The raw flue gas is charged via the conduit 60 to the bottom of the scrubber 62 and is moved upwardly in the scrubber countercurrently to a scrubbling solution and discharged from the nozzle 64 in the top of the scrubber.

In this example, at the start-up of the process an initial scrubbing solution is utilized which consists, on a per minute basis, of 295.1 lbs. of disodium monohydrogen phosphate, 359 lbs. of monosodium dihydrogen phosphate and 2298 lbs. of water. After the inventory of the scrubbing solution in the scrubber 64 has been built up to operating levels, a slip stream is taken from the lower portion of the scrubber through the pump 66 and directed to the conduit 74. At this time, an initial start-up transfer reactant solution is charged to the pump mixer 76 and is constituted, on a per minute basis, of 1020 lbs. of mono (Alamine 336) dihydrogen citrate and 1440 lbs. of kerosene. Admission of this start-up transfer reactant solution to the pumper mixer is continued until the inventory in the total process circuit including the conduit 82, the steam stripper 80, the conduit 84, the centrifuge 78 and the pump mixer 76 has been built up to operating level. After this, except for a slight amount of make-up transfer reactant solution occasionally required, the system is operated on a recycling closed circuit basis with the sulfur dioxide gas removed from the top of the steam stripper 80 via the conduit 86 and valve 88.

During recycling, the phosphate anions and the citrate anions become disproportioned until a steady state is reached. The steady state operation is precisely the same, sequence wise and as far as the steps carried out, as those which are described in Example 5. The compositions of the raw flue gas stream charged to the scrubber 64 via the conduit 60 and the clean flue gas stream leaving the top of the scrubber remain the same as those described in Example 5, but the compositions of the other streams of the process are different. The constitution of these streams, in steady state operation, is as follows:

1. Regenerated scrubbing solution charged to the scrubber 62 via the conduit 68 and nozzle 64:

This stream, as constituted on a per minute basis, ihncludes 199.4 lbs. of disodium monohydrogen phosphate, 110 lbs. of disodium monohydrogen citrate, 271.3 lbs. of monosodium dihydrogen phosphate, 202.3 lbs. of monosodium dihydrogen citrate, 21.9 lbs. of sodium hydrosulfite, and 2300 lbs. of water.

2. The slip stream derived from the recycling scrubbing solution and passed through the conduit 74, as constituted on a per minute basis, is:

50 lbs. of disodium monohydrogen phosphate, 27.7 lbs. of disodium monohydrogen citrate, 397.6 lbs. of monosodium dihydrogen phosphate, 277.8 lbs. of monosodium dihydrogen citrate, 167.9 lbs. of sodium hydrosulfite and 2300 lbs. of water.

3. The regenerated organic transfer reactant separated from regenerated scrubbing solution by means of the centrifugal separator 78 and charged to the pump mixer 76 is constituted on a per minute basis to include:

632 lbs. of mono (Alamine 336) dihydrogen phosphate, 253 lbs. of mono (Alamine 336) dihydrogen, citrate, and 1443 lbs. of kerosene.

4. The stream discharged from the pump mixer 76 into the conduit 82 for circulation to the top of the stripper column 80 is constituted, on a per minute basis, of:

50 lbs. of disodium monohydrogen phosphate, 27.7 lbs. of disodium monohydrogen citrate, 461.6 lbs. of sodium dihydrogen phosphate, 315.6 lbs. of sodium dihydrogen citrate, 94.9 lbs. of sodium hydrogen sulfite, 395.8 lbs. of mono (Alamine 336) dihydrogen phosphate, 157.2 lbs. of mono (Alamine 336) dihydrogen citrate, 305.4 lbs. of mono (Alamine 336) hydrosulfite, 1440 lbs. of kerosene and 2230 lbs. of water.

89.9 lbs. of sulfur dioxide is emitted per minute from the top of the stripping column 80 and is continuously withdrawn via the conduit 86. The overhead from the stripping column 80 is substantially pure $SO_2$ and steam which can be subsequently condensed.

Although certain preferred embodiments of the present invention have been herein described in order to illustrate the basic principles upon which the effectiveness and operativeness of the invention are based, it will be understood that various changes and innovations in the process conditions and reaction parameters can be effected without departure from such basic principles. Changes and innovations of this type are therefore deemed to be circumscribed by the spirit and scope of the invention, except as the same may be necessarily limited by the appended claims or reasonable equivalents thereof.

What is claimed is:

1. A process for removing $SO_2$ from a gaseous mixture comprising:

contacting the gaseous mixture in a scrubbing zone with a scrubbing liquid comprising an aqueous solution of at least one alkali metal scrubbing salt having the formula $M_2B$, where $M^+$ is a monovalent alkali metal cation, and $B^=$ is a divalent anion, said salt being derived from a weak acid having pKa value which is at least 3.0 to yield a pregnant, spent aqueous scrubbing solution containing an alkali metal hydrosulfite salt and a second compound containing a proton and an anion derived from such scrubbing salt;

contacting, in a transfer reaction zone, the pregnant, spent scrubbing solution with an organic liquid phase which contains a transfer reactant, which phase and reactant do not form stable emulsions with water, said transfer reactant being an amine acid salt containing a cationic group derived from at least one amine functional group selected from the class $-NH_2$, $>NH$, $>N-$ and $-N-^+$, and said cationic group further containing a hydrophobic subgroup containing from about 8 to about 45 carbon atoms, said amine salt further containing a monovalent, proton-containing acidic anion, $-HB^-$, having a monovalent cation moiety containing said amine functional group and hydrophobic subgroup attached thereto, said acidic anion being derived from another anion containing one less proton than said monovalent acidic anion, which other anion is derived from a weak acid having a pKa value greater than 3.0, said amine salt having a solubility in water of less than about 5 gms/100 gms of water at 25° C. to yield, by an ion transfer reaction, a post-transfer reaction organic liquid phase containing a sulfur containing amine acid salt yielded by the transfer reaction, and a post-transfer reaction aqueous phase containing either a compound containing the same anion, —HB⁻, as said amine salt or said scrubbing salt;

heating the post-transfer reaction organic liquid phase to decompose the sulfur-containing amine salt to yield sulfur dioxide and to reduce the acidity of the amine phase; and contacting the acidity-reduced amine phase with said post-transfer reaction aqueous phase to yield, by a regeneration reaction, an organic phase which contains regenerated amine acid salt transfer reactant and an aqueous phase containing regenerated alkali metal scrubbing salt.

2. The process defined in claim 1 wherein said transfer reactant is a long chain aliphatic amine salt.

3. The process defined in claim 1 wherein said alkali metal scrubbing salt $M_2B$, is an alkali metal monohydrogen phosphate salt, and said transfer reactant is an amine dihydrogen phosphate salt.

4. The process defined in claim 1 wherein said alkali metal scrubbing salt $M_2B$, is an alkali metal monohydrogen citrate and said transfer reactant is an amine dihydrogen citrate.

5. The process defined in claim 1 wherein said ion-transfer reaction, said decomposition reaction and said regeneration reactions, occurring during said second and last contacting steps and said heating step, are carried out concurrently in a common zone.

6. The process as defined in claim 5 wherein said transfer reactant is a long chain aliphatic amine salt.

7. The process as defined in claim 5 wherein said alkali metal scrubbing salt is an alkali metal monohydrogen phosphate salt, and said transfer reactant is an amine dihydrogen phosphate salt.

8. The process as defined in claim 5 wherein said alkali metal scrubbing salt is an alkali metal monohydrogen citrate and said transfer reactant is an amine dihydrogen citrate.

9. The process defined in claim 5 and further characterized as including the step of adding to the scrubbing liquid prior to or during contacting of the gaseous mixture, an acid salt containing an anion derived from a weak acid whose pKa value is greater than 3.0 and further and additionally containing a proton, H⁺, combined with said anion to form an acid anion, said acid anion being itself derived from a parent acid whose pKa value is less than the pKa value of the parent acid from which said scrubbing salt is derived to thereby provide an acidic environment to promote the decomposition of amine hydrosulfite in the heating-to-decomposition step.

10. The process defined in claim 1 wherein said ion-transfer reaction and the following decomposition reaction are each carried out under an atmosphere of inert gas.

11. The process defined in claim 1 wherein said decomposition reaction is carried out in the presence of an amount of water which, in volume, is at least one-third the volume of said organic phase.

12. The process as defined in claim 1, and further characterized as including the step of adding to the scrubbing liquid prior to or during the contacting of the gaseous mixture, an acid salt containing an anion derived from a weak acid whose pKa value is greater than 3.0 and further and additionally containing a proton, H⁺, combined with said anion to form an acid anion, said acid anion being itself derived from a parent acid whose pKa value is less than the pKa value of the parent acid from which said scrubbing salt is derived to thereby provide an acidic environment to promote the decomposition of amine hydrosulfite in the heating-to-decomposition step.

13. The process defined in claim 1 and further characterized as including the steps of
isolating, as a slip stream, a portion of said aqueous phase developed as a result of said regeneration reaction; and
adding to said slip stream a portion of the sulfur dioxide yielded by the decomposition of said sulfur-containing amine; then
treating the $SO_2$-containing slip stream with a lime slurry to precipitate calcium sulfate therefrom.

14. The process defined in claim 13 wherein said slip stream is maintained at a temperature of from about 15° C. to about 90° C. from the time said sulfur dioxide is added thereto.

15. The process of claim 13 wherein the pressure of said slip stream is maintained at from about 14.7 psia to about 70 psia from the time said sulfur dioxide is added thereto.

16. A process for removing sulfur dioxide from a gaseous mixture as defined in claim 1 wherein said divalent anion —B⁼ is selected from the group consisting of monohydrogen phosphate anion and monohydrogen citrate anion and mixtures thereof.

17. A process for removing $SO_2$ from a gaseous mixture as defined in claim 1 wherein said spent aqueous scrubbing solution contains a predominant portion of a bisulfite salt in relation to any other sulfur-containing salts in said aqueous scrubbing solution, and the post-transfer organic liquid phase contains a major portion of amine hydrosulfite in relation to any other sulfur-containing salts contained therein, whereby efficient thermal decomposition at a relatively low temperature and under atmospheric pressure is facilitated.

* * * * *